(12) United States Patent
Tawaraya et al.

(10) Patent No.: US 7,837,316 B2
(45) Date of Patent: Nov. 23, 2010

(54) CORRECTION INK FOR MICRO DEFECT OF COLOR PATTERN, COLOR FILTER, METHOD FOR CORRECTING MICRO DEFECT OF COLOR PATTERN, AND PROCESS FOR PRODUCING INK

(75) Inventors: Seiji Tawaraya, Tokyo (JP); Shunsuke Sega, Tokyo (JP); Katsunori Arai, Yokohama (JP); Tatsuya Kageyama, Yokohama (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 142 days.

(21) Appl. No.: 12/198,235

(22) Filed: Aug. 26, 2008

(65) Prior Publication Data

US 2009/0098308 A1 Apr. 16, 2009

Related U.S. Application Data

(62) Division of application No. 10/628,791, filed on Jul. 28, 2003, now Pat. No. 7,530,682.

(30) Foreign Application Priority Data

Aug. 2, 2002 (JP) ............................. 2002-226768
Aug. 2, 2002 (JP) ............................. 2002-226769
Aug. 2, 2002 (JP) ............................. 2002-226770

(51) Int. Cl.
*B41J 2/17* (2006.01)
(52) U.S. Cl. .................... 347/96; 347/95; 347/100; 347/102
(58) Field of Classification Search ............... 347/100, 347/96, 95, 101; 523/160; 106/31.6, 31.27, 106/31.13
See application file for complete search history.

(56) References Cited

U.S. PATENT DOCUMENTS 3,674,729 A * 7/1972 Mirick ...................... 524/556

FOREIGN PATENT DOCUMENTS

| JP | 5-210009 A | 8/1993 |
| JP | 6-109919 A | 4/1994 |
| JP | 7-228811 A | 8/1995 |
| JP | 8-182949 A | 7/1996 |
| JP | 11-142635 A | 5/1999 |
| JP | 2001-066418 A | 3/2001 |

* cited by examiner

*Primary Examiner*—Manish S Shah
(74) *Attorney, Agent, or Firm*—Ladas & Parry LLP

(57) ABSTRACT

A correction ink of the present invention is used for correcting a micro defect in a color pattern, which includes a coloring agent, polymer, monomer having reactivity functional group and a solvent, wherein an amount of the solvent is from 25% by weight to 70% by weight of the whole ink, and a viscosity is from 40 to 300 mPa·sec.

7 Claims, 2 Drawing Sheets

CORRECTION INK FOR MICRO DEFECT OF COLOR PATTERN, COLOR FILTER, METHOD FOR CORRECTING MICRO DEFECT OF COLOR PATTERN, AND PROCESS FOR PRODUCING INK

CROSS-REFERENCE TO RELATED APPLICATIONS

This application is a divisional of and claims priority from U.S. application Ser. No. 10/628,791, filed Jul. 28, 2003, which claims priority from Japanese Application Numbers 2002-226768, 2002-226769 and 2002-226770, all filed on Aug. 2, 2002. U.S. application Ser. No. 10/628,791 is expressly incorporated herein by reference.

BACKGROUND OF THE INVENTION

1. Field of the Invention

The present invention relates to an ink to correct a micro defect in a colored pattern, wherein the ink is used for correcting a small defect portion (imperfect portion) in a given colored pattern formed on a substrate, and a correcting method using the same. The present invention also relates to a color filter corrected by using the ink. Further, the present invention relates to a suitable process for producing the ink to correct a micro defect in a colored pattern.

2. Description of the Related Art

When a small colored pattern having a given color such as R (red), G (green), B (blue) or Bk (black) is formed on a substrate, for example, as a color filter for a liquid crystal display device or the like, a pattern defect (pattern imperfection) is generated in certain degree of chances due to a small foreign substance in the production process or in the material of the colored pattern. The pattern defect can be classified into a black defect due to adhesion or the like of the small foreign substance or the like and a white defect (color omission defect or pattern missing defect) in which color is missing and appears to be like white. The white defect also occurs when a fouling is removed from the black defect.

The black defect is not only visually recognizable as a back like spot, but can also cause a serious product defect as it is a projecting imperfect portion, in which when the color filter is affixed together with TFT substrate to compose the display panel, the protrusion reaches the TFT substrate and causes short. The white defect should be avoided since even a small defect of several dozen micrometer will shine like a pin hole and be noticeable when the liquid crystal display device is composed and an image is displayed.

Recently, to meet the need of enlarging size of screen of the liquid crystal display device, there is a trend toward enlarging area of colored patterns. In keeping with this trend, it is more likely that the black defect and the white defect will be generated so that the importance to solve such problems is now increasing than ever.

A skill to partially correct the defect portion disclosed in Japanese Patent Laid-open Publication No. Hei. 6-109919 has been established in order to improve yield ratio and not to damage productivity even if the defect portion is generated. The defect correcting device disclosed therein volatilizes the black defect portion by laser and applies a color ultraviolet curable resin onto a color omission portion of a white defect to be cured by ultraviolet ray.

As methods of applying the color ultraviolet curable resin to the white defect portion, there are methods disclosed in the above publication, which are the method dropping paste of necessary amount by a dispenser and the method using an ink jet. There is also a method disclosed in Japanese Patent Laid-open Publication No. Hei. 8-182949, which imparts the color ultraviolet curable resin on the end of a needle-shaped material formed flat end and presses the needle-shaped material to a defect portion. The publication discloses that the method of directly applying the color ultraviolet curable resin using the needle-shaped material is preferable as it is possible to meet even smaller white defects.

However, the correction does not succeed if the ink for forming small colored pattern is used without change. For example, an ink for forming a coloring layer of a color filter by a printing method has problems that when it is applied to a small color omission portion without change, the viscosity is so high that when the ink is lapped over not only the color omission portion but also a normal color pixel portion, it is likely that the overlapped portion becomes a new protrusion.

As for a coloring resist composition used for a photo process to form a colored pattern, for instance, it aims to evenly apply the resist using spin coat etc. When this composition is applied on a defect portion without change, the viscosity is so low that the applied spot is expanded after applying to have larger overlapped area on the normal color pixel portion leading newly to a color mixing defect. In the case that the viscosity is low, especially when it is applied by a needle-shaped medium, there is a problem of having inferior supportability of the ink on the needle.

Meanwhile, Japanese Patent Laid-open Publication No. Hei. 11-142635 discloses a color paste for applying on a color omission portion using a needle-shaped medium (needle-shaped applying measure). However, the color paste has high solvent content that there are problems such as causing inferior physical stability like viscosity or the like of the color paste at the time of preserving and using and having large volume decrease rate even after applying the color paste due to the volatilization of the solvent. When the volume decrease rate is large, it is difficult to sufficiently thicken a layer of the color omission portion where the paste is supplied and necessary to repeatedly apply the paste to have a sufficient layer thickness. Moreover, if the adhesion amount of one time is increased to have the sufficient layer thickness taking the volume decrease rate into account, the paste runs off to surroundings due to its high liquidity thereby causing a problem such as making a new protrusion or color mixing defect. Also as the color paste has high solvent content, a binder resin content in solid content tends to be small. That will lead to a problem that the adhesive strength of applied layer to a substrate after drying is not good. The binder resin of the color paste is mainly made of polyimide precursor. When content of the binder resin in solid content is made larger, the viscosity becomes higher, which leads to a problem that coating property becomes worse.

Also, as black ink for forming a color filter of a black matrix and a black pigment such as a colored resist composition for the black matrix formed by pattern exposure or the like, a carbon black is conventionally and widely used. However, since the black carbon has electrical conductivity, there is a problem that it may have display imperfection when it is used as a pigment of a correcting black ink because a new protrusion is provided at a corrected portion which reaches to an opposed substrate and electric conduction is generated.

There is proposed to obtain a black color by mixing two pigments of complementary colors instead of using the carbon black as a black color pigment, but actually a combination of two pigments which are perfectly complementary does not exist. Even by mixing two pigments which are nearly complementary colors, it was not able to obtain a black color with high optical density as synthetic dispersion makes the transmissivity in a part of visible light region high and showing blueness and redness.

SUMMARY OF THE INVENTION

In view of the above mentioned problems, an object of the present invention is to provide an ink to correct a micro defect in a colored pattern in which a new controversial protrusion is not generated when the ink is applied on a color omission portion of a white defect; the applied spot does not expand after applying to avoid having larger overlapped area on a normal portion of color pixels; it has good physical stability like viscosity or the like of the ink at the time of preserving and using and small volume decrease rate after applying; and it is able to sufficiently thicken a layer of the color omission portion after filling.

Another object of the present invention is also to provide a correcting method of a micro defect portion using the ink to correct a micro defect in a colored pattern.

Still another object of the present invention is to provide a color filter produced by using the ink to correct a micro defect in a colored pattern.

Further, still another object of the present invention is to provide a suitable method for producing the ink to correct a micro defect in a colored pattern.

A correction ink for a micro defect of a color pattern in the present invention is characterized in that the ink contains at least a coloring agent, monomer having reactivity functional group, polymer and a solvent, wherein an amount of the solvent is from 25% by weight to 70% by weight of the whole ink and the viscosity from 40 to 300 mPa·sec.

the correction ink for a micro defect of a color pattern of the present invention contains both polymer and monomer having the reactivity functional group. Thereby, monomer having reactivity functional group and polymer can share or cover functions required for binder component such as viscosity adjustment, film-forming ability and curability after applying and adhesion property to coating-receiving surface each other. As the result, the degree of freedom in selectivity of polymer increases, for example, polymer does not necessarily need curability or the like, so that the degree of freedom to design the correction ink for a micro defect in a color pattern increases. Therefore, by adjusting the type and quantity of monomer having reactivity functional group and polymer, it is possible to adjust physical property regarding coating property such as viscosity or the like in an appropriate range, and at the same time adjust the quantity ratio of the coloring agent and the binder component in an appropriate range. Thus, sufficient coloring density and sufficient adhesive property to a substrate can be obtained.

The correction ink for a micro defect in a color pattern of the present invention contains monomer having reactivity functional group, therefore, it has effect to improve solvent resistance and heat resistance of a corrected portion and adhesive property to coating-receiving surface compared to the case using polymer singly.

Moreover, a solvent can be partially replaced by the monomer having reactivity functional group so that the content of the solvent in the ink can be reduced. Thereby, the volatilizing amount of the solvent decreases, physical stability such as viscosity or the like of the ink at the time of preserving and using is improved, and the volume decrease rate due to volatilization of the solvent after applying the ink becomes small. The small volume decrease rate makes it possible to sufficiently thicken the layer thickness of the color omission portion where the ink is supplied with a small deposition amount of the ink relieving the bother of applying ink repeatedly. It can also avoid forming of a new protrusion and emergence of a color mixing defect as the imparted ink drop is small in area even before drying and not likely to run off to surroundings.

Since the viscosity of the ink is in the above-mentioned range, the applied spot becomes smooth shape, blur does not emerge, and the projecting height will be acceptable.

It is preferable to have the ink to correct a micro defect in a colored pattern in such case that $\tau$ value is 0.3 to 1.3 when $\gamma$ value is 10 and $\tau$ value is 4.0 to 10.0 when $\gamma$ value is 100, and/or wherein $\tau$ value is 0.3 to 10 when $\gamma$ value is 10 to 100 having slope of 0.075 to 0.15 and degree of 0.8 to 1.1 in the following formula (1) as its viscosity lowers for a moment and the ink loosen to be able to adhere on the end of a needle easily when it is applied on the color omission portion using a needle-shaped medium.

$$\tau = K\gamma^L \qquad \text{formula (1)}$$

wherein $0.081 \leq K \leq 0.111$, $0.881 \leq L \leq 0.954$

It is preferable to have static surface tension of the ink to correct a micro defect in a colored pattern at 25° C. be 20 mN/m to 45 mN as the applied ink does not run off from the applied place to the surroundings, thus avoiding a color mixing defect due to blur of ink and formation of a new protrusion.

It is preferable to have the monomer having reactivity functional group comprise two or more reactivity functional groups in one molecule as high cross-linking density can be obtained and sufficient curability can be exhibited.

It is preferable to include a polymerization inhibitor in the ink to correct a micro defect in a colored pattern as it prevents gelation of the ink and improves stability during preserving and producing the ink.

It is preferable to have said polymer be diallylphthalate prepolymer because of its heat-curability and electric property.

As one embodiment of the correction ink of the present invention, a correcting black ink containing a red coloring agent, a yellow coloring agent, and a blue coloring agent as coloring agents is particularly provided.

Black color of the above mentioned correcting black ink is obtained by mixing three coloring agents, namely red, yellow and blue, instead of using a carbon black as a coloring agent. It is thereby possible to avoid an opposed substrate to have electric conduction due to contact with a protrusion when the new protrusion is generated at a corrected portion. Mixing three coloring agents, namely red, yellow and blue, makes it possible to obtain black color with high optical density as the transmissivity of synthetic spectrum in all part of visible light region (400 nm to 760 nm) becomes equally low without showing blueness and redness, which is different from conventional mixing of two coloring agents of complementary colors.

It is preferable to have the black ink to correct a micro defect in a colored pattern with optical density of 1.0 or more when a layer thickness at cured is 1.9 μm or less as a corrected portion may not be noticeable and sufficient masking effect can be obtained.

The color filter whose performance is equivalent to zero-defects product can be obtained by correcting a defect in a pixel portion or a black matrix using the ink to correct a micro defect in a colored pattern.

It is preferable to have a step to radiate light after applying the ink to correct a micro defect in a colored pattern onto a micro defect portion in a colored pattern in the correcting method of a micro defect in a colored pattern of the present invention as it is possible to primary cure a surface of the corrected portion in no time or cure the whole corrected portion in short time when aforementioned correction ink of the present invention contains monomer or polymer having reactivity functional group.

The process for production of the correction ink for a micro defect in a colored pattern provided in the present invention is a process for production of the ink to correct a micro defect in a colored pattern comprising at least a coloring agent, monomer having reactivity functional group, polymer and a solvent wherein an amount of the solvent is from 25% by weight to 70% by weight of the whole ink, and characterizes in that comprises steps of:

preparing coloring agent dispersion by dispersing the coloring agent in the solvent;

preparing varnish by mixing the monomer having reactivity functional group with the polymer; and mixing the prepared coloring agent dispersion with the varnish.

This process is highly suitable for production of the correction ink of the present invention. The process comprises steps of: preparing coloring agent dispersion by dispersing the coloring agent in the solvent; preparing varnish by mixing the monomer having reactivity functional group with the polymer; and mixing the prepared coloring agent dispersion with the varnish. Therefore, in the case of producing the ink whose amount of the solvent is small and limited to 25% by weight to 70% by weight of the whole ink, the coloring agent is well dispersed using the solvent, and the polymer is separately solved by monomer having reactivity functional group as alternative of the solvent to prepare varnish so that an ink having sufficiently good disperse condition of the coloring agent and having physical property such as viscosity or the like suitable for the ink to correct a micro defect in a colored pattern can be produced.

It is preferable to produce the ink to have the viscosity in a range of 40 to 300 mPa·sec. as the applied spot becomes smooth shape, blur does not emerge, and the projecting height will be acceptable.

It is preferable to compound a polymerization inhibitor at a varnish preparing step as it prevents gelation of the varnish and the ink and improves stability during preservation.

It is also preferable to have the polymer be heated and melted at the varnish preparing step as it facilitates dissolution.

Further, it is preferable to have the monomer having reactivity functional group be a photo-curable resin at the varnish preparing step as it is possible to increase heating temperature if polymer is heated and melted at the time of preparing the varnish.

By the present process for production, it is possible to provide the correcting ink having good dispersibility of the coloring agent even if the amount of the solvent is significantly small such as from 25% by weight to 55% by weight of the whole ink.

BRIEF DESCRIPTION OF THE DRAWINGS

In the accompanying drawings.

Figure 1:
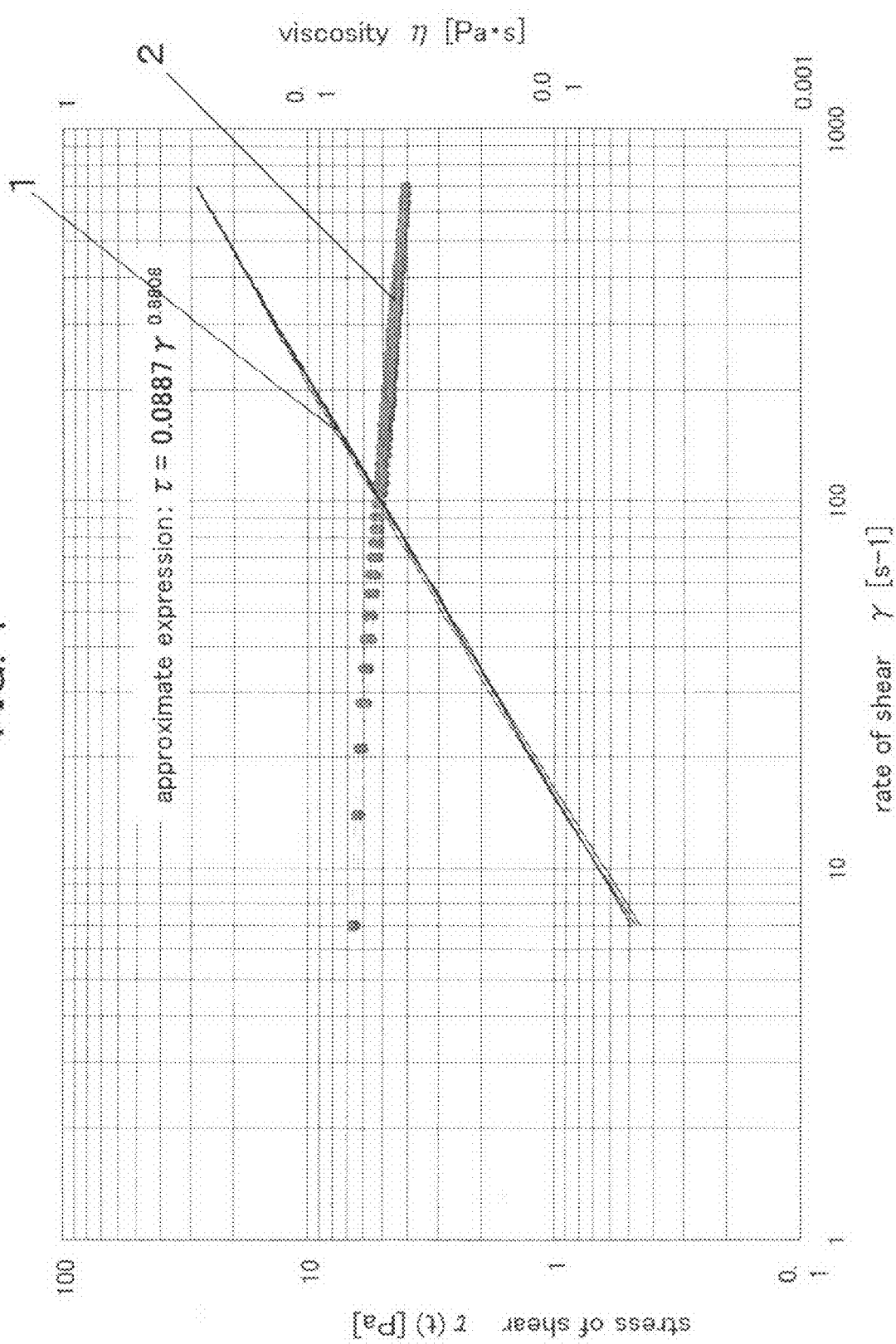
FIG. 1 is a graph plotting rate of shear and stress of shear of a correction ink for a micro defect in a colored pattern of the present invention by logarithmic scale and showing viscosity measuring result by changing rate of shear.

The signs in each figure refer to the following:

1: a graph plotting rate of shear and stress of shear by logarithmic scale

2: a graph showing the viscosity measuring result by changing rate of shear

DETAILED DESCRIPTION OF THE PREFERRED EMBODIMENTS

Hereinafter, the present invention will be explained in more detail. It is to be noted that "(meth)acrylic" in the present specification means "acrylic" or "methacrylic". Also, (meth) acrylate means acrylate or methacrylate.

Also, light in the present specification is defined to include all visible and invisible light regions which can cause photoreaction to optically reactive function groups, for instance, micro wave, visible light, ultraviolet rays, electromagnetic wave, electron beam or the like, but ultraviolet rays and electron beam are mainly used.

Firstly, a correction ink for a micro defect in a colored pattern of the present invention will be explained in detail. The correction ink for a micro defect in a colored pattern of the present invention characterizes in that the ink contains at least a coloring agent, monomer having reactivity functional group, polymer and a solvent, wherein an amount of the solvent is from 25% by weight to 70% by weight of the whole ink, and a viscosity of the ink is from 40 to 300 mPa·sec.

The correction ink for a micro defect in a colored pattern of the present invention contains both polymer and monomer having reactivity functional group as binder component. Thereby monomer having reactivity functional group and polymer can share functions required for binder component, such as viscosity adjustment, film-forming ability and curability after applying, and adhesion property to coating-receiving surface with each other. Or monomer having reactivity functional group and polymer can compensate deficient functions of the counter component to each other. As the result, the degree of freedom in selectivity of polymer increases, for example, polymer does not necessarily need curability or the like, so that the degree of freedom to design the correction ink for a micro defect in a colored pattern increases. Therefore, it is possible to adjust physical property regarding coating property such as viscosity or the like in an appropriate range by controlling kind and quantity of monomer having reactivity functional group and polymer, and at the same time, sufficient coloring density and sufficient adhesive property to a substrate can be obtained by controlling quantity ratio of the coloring agent and the binder component in an appropriate range.

The correction ink for a micro defect in a colored pattern of the present invention contains monomer having reactivity functional group, therefore, it has effect to improve solvent resistance and heat resistance of a corrected portion and adhesive property to a coating-receiving surface compared to the case using polymer singly.

Moreover, a solvent can be partially replaced by the monomer having reactivity functional group so that the content of the solvent in the ink can be reduced. Thereby, the volatilizing amount decreases to improve physical stability such as viscosity or the like of the ink at the time of preserving and using, and volume decrease rate due to volatilization of the solvent after applying the ink becomes small. The small volume decrease rate makes it possible to sufficiently thicken the layer thickness of a color omission portion where ink is supplied with small deposition amount of the ink relieving the bother of applying the ink repeatedly. It can also avoid forming of a new protrusion and emergence of a color mixing defect as the imparted ink drop is small in area even before drying and not likely to run off to surroundings.

The coloring agent which can be used for the correction ink for a micro defect in a colored pattern of the present invention is not particularly limited. However, it is preferable to select in accordance with a color of a coloring pattern to be corrected. Various organic or inorganic pigments can be used. As examples of organic pigments, there are compounds classified as pigment in color index (C.I.: published by The Society of Dyers and Colourists), that is, following compounds with color index (C.I.) numbers:

yellow pigments such as C.I. Pigment yellow 1, C.I. Pigment yellow 3, C.I. Pigment yellow 12, C.I. Pigment yellow 13, C.I. Pigment yellow 83, C.I. Pigment yellow 138, C.I. Pigment yellow 139, C.I. Pigment yellow 150, C.I. Pigment yellow 180, C.I. Pigment yellow 185 or the like;

red pigments such as C.I. Pigment red 1, C.I. Pigment red 2, C.I. Pigment red 3, C.I. Pigment red 177, C.I. Pigment red 254 or the like;

blue pigments such as C.I. Pigment blue 15, C.I. Pigment blue 15:3, C.I. Pigment blue 15:4, C.I. Pigment blue 15:6;

green pigments such as C.I. Pigment green 7, C.I. Pigment green 36 or the like; and violet pigments such as C.I. Pigment violet 23, C.I. Pigment violet 23:19 or the like.

As examples of inorganic pigments, there are titanium oxide, barium sulfate, calcium carbonate, zinc oxide, lead sulfate, yellow lead, zinc yellow, red oxide (red iron oxide (III)), cadmium red, ultramarine blue, Prussian blue, chromium oxide green, cobalt green, umber, titanium black, synthetic iron black, carbon black or the like. The pigment of the present invention may be used singly or by mixing two or more kinds. It is not limited to the above but various pigments can be used. If necessary, the pigment for use may be subject to a surface processing such as rosin treatment, acidic treatment, basic treatment or the like.

The amount of the coloring agent may be preferably from 5% by weight to 40% by weight of the whole ink to correct a micro defect in a colored pattern, more preferably from 5% by weight to 25% by weight, and even more preferably from 7% by weight to 18% by weight.

In the present invention, if a correcting black ink is prepared to correct a defect in a black colored pattern such as a black matrix, high masking ability can be obtained by using a carbon black. However, the carbon black is high in electric conductivity. Thereby, there are problems that it is likely to cause electric conduction, and dispersing ability in an ink having a high concentration is not good enough.

As coloring agents of the correcting black ink, it is preferable to use by mixing three coloring agents, namely red coloring agent, yellow coloring agent and blue coloring agent, which are small in electric conductivity.

It is difficult to carry out suitable rheologic control to make the correcting black ink have necessary physical property such as viscosity or the like while dispersing carbon black in the correcting black ink at a high concentration. However, in the case of obtaining black color by mixing three coloring agents, namely red, yellow and blue, if a coloring agent of good dispersing ability is selected for each agent, namely red coloring agent, yellow coloring agent and blue coloring agent, the coloring agent can be dispersed in the correcting black ink at high density while achieving suitable rheology, thereby obtaining black color having good coating ability and density of more than expected.

When difference in level emerges between the portion corrected with the black ink and the surroundings and a new protrusion appears, it can avoid causing electric conductivity due to contact of an opposed substrate and the protrusion by using coloring agents having small electric conductivity regarding each of the red, yellow and blue coloring agents.

Mixing three coloring agents, namely red, yellow and blue, makes it possible to obtain black color with high optical density as the transmissivity of synthetic spectrum in all part of visible light region (400 nm to 760 nm) becomes equally low without showing blueness and redness, which is different from conventional mixing of two coloring agents of complementary colors.

The three coloring agents to be used for adjusting the ink to be black can be selected accordingly from various organic or inorganic pigments. In view of spectral characteristics and electric conductivity, as examples of organic pigments, there are compounds classified as pigment in color index (C.I.: published by The Society of Dyers and Colourists), that is, following compounds with color index (C.I.) numbers.

In a view point of avoiding electric conduction even in the case that relatively large protrusion is formed on the corrected portion and it contacts the opposed substrate, it is preferable to have low electric conductivity for each coloring agent, namely red, yellow and blue coloring agents. Specifically, preferable electric conductivity of each coloring agent is $10^{10}$ Ωcm or more, and more preferably $10^{13}$ Ωcm or more.

Suitable examples of red coloring agents are red pigments such as C.I. Pigment red 1, C.I. Pigment red 2, C.I. Pigment red 3, C.I. Pigment red 9, C.I. Pigment red 97, C.I. Pigment red 122, C.I. Pigment red 123, C.I. Pigment red 144, C.I. Pigment red 149, C.I. Pigment red 166, C.I. Pigment red 177, C.I. Pigment red 180, C.I. Pigment red 192, C.I. Pigment red 215, C.I. Pigment red 216, C.I. Pigment red 224, C.I. Pigment red 254 or the like.

Suitable examples of yellow coloring agents are yellow pigments such as C.I. Pigment yellow 1, C.I. Pigment yellow 3, C.I. Pigment yellow 12, C.I. Pigment yellow 13, C.I. Pigment yellow 20, C.I. Pigment yellow 24, C.I. Pigment yellow 83, C.I. Pigment yellow 86, C.I. Pigment yellow 93, C.I. Pigment yellow 94, C.I. Pigment yellow 109, C.I. Pigment yellow 110, C.I. Pigment yellow 117, C.I. Pigment yellow 125, C.I. Pigment yellow 137, C.I. Pigment yellow 138, C.I. Pigment yellow 139, C.I. Pigment yellow 147, C.I. Pigment yellow 148, C.I. Pigment yellow 150, C.I. Pigment yellow 153, C.I. Pigment yellow 154, C.I. Pigment yellow 166, C.I. Pigment yellow 173, C.I. Pigment yellow 180, C.I. Pigment yellow 185 or the like.

Suitable examples of blue coloring agents are blue pigments such as C.I. Pigment blue 15, C.I. Pigment blue 15:3, C.I. Pigment blue 15:4, C.I. Pigment blue 15:6, C.I. Pigment blue 21, C.I. Pigment blue 22, C.I. Pigment blue 60, C.I. Pigment blue 64 or the like.

As examples of said inorganic pigments are red coloring agents such as red iron oxide (III), cadmium red or the like, yellow coloring agents such as yellow lead, zinc yellow or the like, and blue coloring agents such as ultramarine blue, Prussian blue or the like.

As for each of three coloring agents, namely red, yellow and blue, of the present invention, it is preferable to select combination of three coloring agents and adjust the amount of the coloring agents so that the spectral transmissivity synthesized by three coloring agents of red, yellow and blue becomes equally low in all part of visible light region (400 nm to 760 nm). A criterion to select three coloring agents may be indicated by measuring value of transmissivity of visible light beam and omega converted value of light absorbance measured by means of a spectrometer or a Macbeth transmission densitometer.

Among those coloring agents, as red coloring agents, it is preferable to use C.I. Pigment red 177 and C.I. Pigment red 254. As yellow coloring agents, it is preferable to use C.I. Pigment yellow 83 and C.I. Pigment yellow 139. As blue coloring agents, it is preferable to use C.I. Pigment blue 15:3 and C.I. Pigment blue 15:6. Further among these, it is preferable to use in combination of C.I. Pigment red 254 as a red coloring agent, C.I. Pigment yellow 139 as a yellow coloring agent and C.I. Pigment blue 15:6 as a blue coloring agent or in combination of C.I. Pigment red 177 as a red coloring agent, C.I. Pigment yellow 83 as a yellow coloring agent, and C.I. Pigment blue 15:3 as a blue coloring agent. Particularly, the combination of C.I. Pigment red 254, C.I. Pigment yellow 139 as a yellow coloring agent and C.I. Pigment blue 15:6 as a blue coloring agent at the compounding ratio of 4:2:4 is a preferable use.

Each of three coloring agents, namely red, yellow and blue, of the present invention, may be used singly or by mixing two or more kinds. It is not limited to the above mentioned but various coloring agents can be used. If necessary, the coloring agent for use may be subject to a surface processing such as rosin treatment, acidic treatment and basic treatment.

The sum of the amount of three coloring agents may be preferably from 5% by weight to 40% by weight of the whole black ink to correct a micro defect in a colored pattern, more preferably from 5% by weight to 25% by weight, and even more preferably from 7% by weight to 18% by weight.

In the correction ink for a micro defect in a colored pattern of the present invention, monomer having reactivity functional group comprises binder component which provides film-forming ability and adhesion to the coating-receiving surface together with polymer which will be described hereinafter, and particularly provides curing reactivity. Also, the monomer is a component to be substituted for a part of solvent while it is a component providing effect to reduce used amount of the solvent and adjust physical property such as viscosity or the like of an ink.

Therefore, the monomer having reactivity functional group to be used in process for production of the ink to correct a micro defect in a colored pattern of the present invention will be a compound which can be a component unit of polymerizing reaction. For example, oligomer is a polymer of two or more monomer, however, if it has reactivity functional group and has liquidity at ordinary temperature, it can be used as monomer in the present invention.

Such monomer having reactivity functional group may be used singly or by mixing two or more kinds.

It is preferable to use multifunctional reactive monomer having two or more reactivity functional groups in one molecule as the monomer having reactivity functional group because high cross-linking density can be obtained and satisfactory curability can be exhibited.

A reaction type of reactivity functional group is not particularly limited if it is a curing reaction. It may be a reaction which belongs to either photoreaction or thermal reaction in regard to reaction energy. It may belong to any of radical polymerization, cationic polymerization, anionic polymerization, dimerizing-photoreaction or the like in regard to active species. For example, when monomer has ethylenic unsaturated bond as reactivity functional group, photo radical polymerization and thermal radical polymerization are possible. When monomer has epoxy group as reactivity functional group, thermal setting and photo cationic polymerization are possible.

As for photo reactive monomer, monomer having ethylenic unsaturated bond is preferably used. The monomer having ethylenic unsaturated bond as a photo radical polymerization group starts polymerization reaction directly by light radiation or indirectly by receiving action of initiator. Thus, it is preferably used to fix the ink in short time by light radiation after the correcting ink is applied on a micro defect portion in a colored pattern.

Examples of monomer having ethylenic unsaturated bond include the following multifunctional acrylates monomers: dipentaerythritolhexa(meth)acrylate, dipentaerythritolpenta(meth)acrylate, pentaerythritoltetra(meth)acrylate, trimethylolpropanetri(meth)acrylate, pentaerythritoltri(meth)acrylate, pentaerythritol(meth)acrylate, diallylphthalate, tripropyleneglycoldi(meth)acrylate, neopentylglycoldi(meth)acrylatepropyleneoxide adduct, ethyleneglycol(meth)acrylate, diethyleneglycoldi(meth)acrylate, propyleneglycoldi(meth)acrylate, dipropyleneglycoldi(meth)acrylate, polyethyleneglycoldi(meth)acrylate, polypropyleneglycoldi(meth)acrylate, hexanedi(meth)acrylate, neopentylglycoldi(meth)acrylate, glycerindi(meth)acrylate, glycerintri(meth)acrylate, glycerintetra(meth)acrylate, tetratrimethylolpropanetri(meth)acrylate, 1,4-butanedioldiacrylate or the like. Among the above, the followings are preferable as they have high cross-linking density and sufficient curability: dipentaerythritolhexaacrylate, dipentaerythritolpenta(meth)acrylate, pentaerythritoltetra(meth)acrylate, trimethylolpropanetri(meth)acrylate and pentaerythritoltri(meth)acrylate.

As photo cationic polymerization reactive monomer, there may be monomer having cyclic ether group such as epoxy group, oxetanyl group or the like, thioether group, vinyl ether group, etc.

As photo anionic polymerization monomer, there may be monomer having vinyl group with electron attractant group, cyclic urethane group, cyclic ureas, cyclic siloxane group or the like.

For thermal reactive system, there may be ring-opening addition reaction system such as epoxy group and active hydrogen, cyclic urea group and hydroxyl group, etc. Particularly preferred examples may be a combination of monomer (including oligomer) having glycidyl group, alicyclic epoxy group, oxetanyl group and polybasic carboxylic anhydride or polybasic carboxylic acid in view of stability during elapse. In regard to curability, it is particularly preferable to use a combination of monomer having glycidyl group, alicyclic epoxy group or oxetanyl group and blocked carboxylic acid which is disclosed in Japanese Patent No. 2,682,256, No. 2,850,897 and No. 2,894,317 and Japanese Patent Laid-open No. 2001-350010.

As for the monomer having glycidyl group, alicyclic epoxy group, oxetanyl group, there may be novolaks epoxy, alicyclic epoxy, cardo epoxy or the like which are liquid state in ordinary temperature. Concrete examples include BPEFG (trade name, available from Nagase Chemtec Corporation); Celloxide 2021P, 3000 and 2000, styrene oxide, Epolead GT300, GT400 (trade names, available from Daicel Chemical Industries, Ltd.); Epikote 901, 801P, 802, 802XA, 806, 806L, 807, 815, 819, 825, 827, 828, 815XA, 828EL, 828XA, 152, 604 and 630 (trade names, available from Yuka Shell Epoxy K.K.). Among them, Epolead GT400 which is alicyclic epoxy may be preferable in view of viscosity and reactivity.

As polybasic carboxylic anhydride used in combination with monomer having epoxy group, there may be aliphatic or alicyclic dicarboxylic anhydride such as phthalic anhydride, itaconic anhydride, succinic anhydride, citraconic anhydride, dodecenyl succinic anhydride, tricarbarylic anhydride, maleic anhydride, hexahydrophthalic anhydride, dimethyltetrahydrophthalic anhydride, himic anydride, nadinic anhydride or the like; aliphatic polybasic carboxylic dianhydride such as 1,2,3,4-butanetetracarboxylic dianhydride, cyclopentane tetracarboxylic dianhydride or the like; aromatic polybasic carboxylic anhydride such as pyromellitic dianhydride, trimellitic anhydride, benzophenonetetracarboxylic anhydride or the like; and ester group containing acid anhydride such as ethyleneglycolbistrimellitate, glycerintristrimellitate or the like. Among them, the particularly preferred may be aromatic polybasic carboxylic anhydride. A commercially available epoxy resin curing agent made of carboxylic anhydride may also be suitable.

As polybasic carboxylic acid used in combination with monomer having epoxy group, there may be aliphatic polybasic carboxylic acid such as succinic acid, glutaric acid, adipic acid, butanetetracarboxylic acid, maleic acid, itaconic acid or the like; aliphatic polybasic carboxylic acid such as hexahydro phthalic acid, 1,2-cyclohexanedicarboxylic acid, 1,2,4-cyclohexanetricarboxylic acid, cyclopentanetetracarboxylic acid or the like; and aromatic polybasic carboxylic acid such as phthalic acid, isophthalic acid, terephthalic acid, pyromellitic acid, trimellitic acid, 1,4,5,8-naphthalenetetracarboxylic acid, benzophenonetetracarboxylic acid. Among them, particularly preferred may be aromatic polybasic carboxylic acid.

Such polybasic carboxylic anhydride and polybasic carboxylic acid may be used singly or by mixing two or more kinds. The amount of a curing agent is generally in the range of 50 to 200 parts by weight per monomer having epoxy group of 100 parts by weight.

As photo reactive or thermal reactive monomer, there may be used monomer having ethylenic unsaturated bond and epoxy group. Examples of photo reactive or thermal reactive monomer include (meth)acrylates such as glycidyl acrylate, glycidyl methacrylate, glycidyl α-ethyl acrylate, glycidyl α-n-propyl acrylate, glycidyl α-n-butyl acrylate, 3,4-epoxybutyl acrylate, 3,4-epoxybutyl methacrylate, 4,5-epoxypentyl methacrylate, 6,7-epoxyheptyl acrylate, 6,7-epoxyheptyl methacrylate, 6,7-epoxyheptyl α-ethyl acrylate or the like; vinylglycidyl ethers such as o-vinylphenylglycidyl ether, m-vinylphenylglycidyl ether, p-vinylphenylglycidyl ether, o-vinylbenzylglycidyl ether, m-vinylbenzylglycidyl ether, p-vinylbenzylglycidyl ether or the like; 2,3-diglycidyloxystyrene, 3,4-diglycidyloxystyrene, 2,4-diglycidyloxystyrene, 3,5-diglycidyloxystyrene, 2,6-diglycidyloxystyrene, 5-vinylpyrogalloltriglycidyl ether, 4-vinylpyrogalloltriglycidyl ether, vinylphloroglucinoltriglycidyl ether, 2,3-dihydroxymethylstyrenediglycidyl ether, 3,4-dihydroxymethylstyrenediglycidyl ether, 2,4-dihydroxymethylstyrenediglycidyl ether, 3,5-dihydroxymethylstyrenediglycidyl ether, 2,6-dihydroxymethylstyrenediglycidyl ether, 2,3,4-trihydroxymethylstyrenetriglycidyl ether, 1,3,5-trihydroxymethylstyrenetriglycidyl ether; and alicyclic epoxy(meth)acrylate or the like.

The amount of monomer having reactivity functional group may be preferably from 15% by weight to 65% by weight in the ink to correct a micro defect in a colored pattern, more preferably from 20% by weight to 55% by weight, and even more preferably from 25% by weight to 45% by weight.

Polymer is compounded in the ink to correct a micro defect in a colored pattern of the present invention as a binder component which provides film-forming ability and adhesion to the coating-receiving surface, and also as a component to adjust physical property such as viscosity or the like of ink due to its high viscosity in the state of an ink compared with monomer.

In the present invention, the polymer shares or covers function as a binder component each other with the monomer having reactivity functional group. As the result, the degree of freedom in selectivity of polymer increases so that the degree of freedom to design the ink to correct a micro defect in a colored pattern increases.

Applicable polymer may not be particularly limited if it is soluble to the solvent to be used or has miscibility to monomer having reactivity functional group to be used. In the present invention, the polymer which has miscibility to monomer having reactivity functional group is preferable in order to give the monomer having reactivity functional group a function partially replacing the solvent.

Polymer to be used has high viscosity in the state of an ink compared with monomer and is used to adjust and keep viscosity high. Thus, weight average molecular weight may preferably be 30,000 or more (polystyrene-converted weight average molecular weight measured by Gel Permeation Chromatography (GPC)), and more preferably 50,000 or more. In this case, an effect of sufficient increase in viscosity may often be obtained with small amount of polymer.

Such polymer may be used singly or by mixing two or more kinds.

Also, polymer of same kind as that used in the colored pattern to be corrected may be preferred in view of assimilability, adhesion or the like of a correcting color paste to a corrected portion. For example, polymer generally used in the colored pattern of the color filter is acrylic resin or the like. If the colored pattern of the color filter is to be corrected, said polymer may preferably used.

The polymer to be used can be either reactive or not reactive. Using reactive polymer is preferable as it can cure the coating layer by reaction to increase layer strength. The reaction type of reactivity functional group may be similar to aforementioned monomer having reactivity functional group and not particularly limited.

Examples of not reactive polymer include polymer made from the following monomer or copolymer made from two or more monomer of the followings: (meth)acrylic acid, methyl (meth)acrylate, 2-hydroxyethyl(meth)acrylate, benzyl(meth)acrylate, styrene, polystyrene macromonomer, polymethylmethacrylate macromonomer, cyclohexyl(meth)acrylate, α-hydroxymethyl(meth)acrylate, α-hydroxyethyl(meth)acrylate, tricyclodecanyl (meth)acrylate or the like.

The reactive polymer may be polymer having reactivity functional group, for example, polymer having ethylenic unsaturated bond, polymer having epoxy group, polymer having oxazoline group, polymer having cyclic urea group, polymer having cyclic ester group, polyimide precursor (polyamic acid), melamine resin or the like. In view of stability and reactivity, polymer having ethylenic unsaturated bond and polymer having epoxy group are preferably used.

As polymer having ethylenic unsaturated bond, there may be used polymer and copolymer made from single or two or more kinds of monomers of multifunctional acrylate having ethylenic unsaturated bond. In particular among them, diallylphthalate prepolymer, and a polymer disclosed in Japanese Patent Laid-open Publication No. 2000-239497, are preferably used in regard to thermal curability.

The amount of polymer may be preferably from 1% by weight to 25% by weight in the ink to correct a micro defect in a colored pattern, more preferably from 2% by weight to 20% by weight, and even more preferably from 2% by weight to 12% by weight.

The solvent used for the ink to correct a micro defect in a colored pattern of the present invention may not particularly be limited. However, it is preferred to use a solvent which has good dispersing ability to the coloring agent and good solubility or dispersing ability to monomer having reactivity functional group and polymer. It may also be a mixed solvent using two or more solvents.

Examples of the solvent include nonaqueous organic solvent like alcohols solvent such as methylalcohol, ethylalcohol, N-propylalcohol, i-propylalcohol or the like; cellosolves solvent such as methoxyalcohol, ethoxyalcohol or the like; carbitols solvent such as methoxyethoxyethanol, ethoxyethoxyethanol or the like; esters solvent such as ethyl acetate, butyl acetate, methyl methoxypropionate, ethyl ethoxypropionate, ethyl lactic acid or the like; ketones solvent such as acetone, methylisobutylketone, cyclohexanone or the like; cellosolve acetates solvent such as methoxyethylacetate, ethoxyethylacetate, ethyl cellosolve acetate or the like; carbitol acetates solvent such as methoxyethoxyethylacetate, ethoxyethoxyethylacetate or the like; ethers solvent such as diethyl ether, ethyleneglycoldimethyl ether, diethyleneglycoldimethyl ether, tetrahydrofuran or the like; aprotic amide solvent such as N,N-dimethylformamide, N,N-dimethylacetamide, N-methylpyrrolidone or the like; lactones solvent such as γ-butyrolactone or the like; unsaturated hydrocarbons solvent such as benzene, toluene, xylene, naphthalene or the like; and saturated hydrocarbons solvent such as N-heptane, N-hexane, N-octane or the like. Among them, preferably used solvents may be cellosolve acetates solvent such as methoxyethyl acetate, ethoxyethyl acetate, ethyl cellosolve acetate or the like; carbitol acetates solvent such as methoxyethoxyethyl acetate, ethoxyethoxyethylacetate or the like; ethers solvent such as ethyleneglycoldimethyl ether, diethyleneglycoldimethyl ether, propyleneglycoldiethyl ether or the like; and esters solvent such as methyl methoxypropionate, ethyl ethoxypropionate, ethyl lactic acid or the like. The solvents used more preferably include PGMEA (propyleneglycolmonomethyl ether acetate, $CH_3OCH_2CH(CH_3)OCOCH_3$) (trade name: methoxypropylacetate available from Daicel Chemical Industries, Ltd.), MBA (acetate-3-methoxybutyl, $CH_3CH(OCH_3)CH_2CH_2OCOCH_3$), DMDG (diethyleneglycoldimethyl ether, $H_3COC_2H_4OCH_3$) or mixture thereof.

The amount of solvent may be preferably from 25% by weight to 70% by weight in the ink to correct a micro defect in a colored pattern, more preferably from 25% by weight to 55% by weight, and even more preferably from 30% by weight to 45% by weight.

In the ink to correct a micro defect in a colored pattern of the present invention, it is preferable to compound a polymerization inhibitor and/or a pigment dispersant and/or a polymerization initiator.

The correction ink in the present invention contains monomer having reactivity functional group as essential component. Therefore, it is preferred to contain the polymerization inhibitor as it prevents gelation of the ink and improves stability during preserving. As the polymerization inhibitor, though it is not particularly limited, there may be used diphenylpicrylhydrazide, tri-p-nitrophenylmethyl, p-benzoquinon, p-tert-butylcatechol, picric acid, copper chloride, methylhydroquinon, p-methoxyphenol, tert-butylhydroquinon or the like. Among them, hydroquinons polymerization inhibitor may be preferably used in view of preservation stability, and more preferably methylhydroquinon may be used.

The amount of the polymerization inhibitor may be preferably from 0.01% by weight to 1% by weight in the ink to correct a micro defect in a colored pattern, more preferably from 0.01% by weight to 0.5% by weight, and even more preferably from 0.01% by weight to 0.05% by weight.

The pigment dispersant is preferably compounded for the purpose of improving dispersing ability of the coloring agent in the ink. Examples of the pigment dispersant include: amide compound such as nonaneamide, decaneamide, dodecaneamide, N-dodecylhexadecaneamide, N-octadecylpropioamide, N,N-dimethyldodecaneamide, N,N-dihexylacetamide or the like; amine compound such as diethylamine, diheptylamine, dibutylhexadecylamine, N,N,N',N'-tetramethylmethaneamine, triethylamine, tributylamine, trioctylamine or the like; amine having hydroxyl group such as monoethanolamine, diethanolamine, triethanolamine, N,N,N',N'-(tetrahydroxyethyl)-1,2-diaminoethane, N,N,N'-tri(hydroxyethyl)-1,2-diaminoethane, N,N,N',N'-tetrahydroxyethylpolyoxyethylene)-1,2-diaminoethane, 1,4-bis(2-hydroxyethyl)piperazine, 1-(2-hydroxyethyl)piperazine or the like; nipecotamide, isonipecotamide, nicotinic-acid amide or the like; polyurethane; polycarboxylic acid ester such as polyacrylate or the like; unsaturated polyamide; polycarboxylic(partial)amine salt; polycarboxylic ammonium salt; polycarboxylic alkylamine salt; polysiloxane; long-chain polyaminoamide phosphate; ester of polycarboxylic acid having hydroxyl group and modifications thereof; polyester-base high-molecular-weight pigment dispersant which is amide and salt thereof formed by reacting poly (lower alkyleneimine) with polyester having free carboxyl group. In view of good dispersing ability even in high concentration of the coloring agent, it is preferred to use polyester-base high-molecular-weight pigment dispersant, and more preferably Solsperse 24000GR (trade name, available from Avecia KK).

The amount of pigment dispersant may be preferably from 1% by weight to 25% by weight in the ink to correct a micro defect in a colored pattern, more preferably from 1% by weight to 15% by weight, and even more preferably from 1% by weight to 10% by weight.

The polymerization initiator is preferably compounded for the purpose of improving reactivity of monomer having reactivity functional group and reactive polymer.

In the case of using monomer and/or polymer having radical polymerization group such as ethylenic unsaturated bond, radical polymerization initiator is generally added. As radical polymerization initiator, there may be used acetophenones, benzophenones, ketals, anthraquinones, thioxanthones, azo compound, peroxide, 2,3-dialkyldione compounds, disulfide compounds, thiuram compounds, fluoroamine compound or the like. Examples of radical polymerization initiator may include 1-hydroxy-cyclohexyl-phenyl-ketone, 2-methyl-1[4-(methylthio)phenyl]-2-morpholinopropane-1-one, benzyldimethylketone, 1-(4-dodecylphenyl)-2-hydroxy-2-methylpropane-1-one, 2-hydroxy-2-methyl-1-phenylpropane-1-one, 1-(4-isopropylphenyl)-2-hydroxy-2-methylpropane-1-one, benzophenone or the like. Among them, the initiators such as acetophenones and thioxanthones compound are preferably used. For example, 2-benzyl-2-dimethylamino-1-(4-morpholinophenyl)-butane-1,2-methyl-1-(4-methylthiophenyl)-2-morpholino-propane-1-one, and diethylthioxanthone are preferably used in the present invention in view of sensitivity and low oxygen inhibition. They may be used singly or by combination.

As a photo cationic polymerization initiator, there may be used sulfonic ester, imidosulfonate, dialkyl-4-hydroxysulfonium salt, arylsulfonic acid p-nitrobenzyl ester, silanol-aluminum complex, ($\eta^6$-benzene)($\eta^5$-cyclopentadienyl)iron(II) or the like. Examples of the photo cationic polymerization initiator may include benzointosylate, 2,5-dinitrobenzyltosylate, N-tosylphthalic imide or the like though it is not limited thereto.

As initiators which can be used both as an photo radial polymerization initiator and the photo cationic polymerization initiator, there may be used aromatic iodonium salt, aromatic sulfonium salt, aromatic diazonium salt, aromatic phosphonium salt, triazine compound, iron arene complex or the like. Examples thereof may include: iodonium salt such as chloride, bromide, fluoroborate salt, hexafluorophosphate salt, hexafluoro antimonate or the like of iodonium such as diphenyl iodonium, ditolyl iodonium, bis(p-tert-butylphenyl) iodonium, bis(p-chlorophenyl)iodonium or the like; sulfonium salt such as chloride, bromide, fluoroborate salt, hexafluorophosphate salt, hexafluoro antimonate or the like of sulfonium such as triphenylsulfonium, 4-tert-butyltriphenyl sulfonium, tris(4-methylphenyl)sulfonium or the like; 2,4,6-substituted-1,3,5 triazine compound such as 2,4,6-tris (trichloromethyl)-1,3,5-triazine, 2-phenyl-4,6-bis(trichloromethyl)-1,3,5-triazine, 2-methyl-4,6-bis(trichloromethyl)-1,3,5-triazine or the like though it is not limited thereto.

As a photo anionic polymerization initiator, compounds which generate amine by ultraviolet irradiation may be used. Examples of the photo anionic polymerization initiator include 1,10-diaminodecane, 4,4'-trimethylenedipiperidine, carbamates and the derivative thereof, cobalt-amine complexes, aminooxyiminos, ammoniumborates or the like. As commercial item, there may be NBC-101 available from Midori Kagaku Co., Ltd.

The amount of the polymerization initiator may be preferably from 2% by weight to 20% by weight in an ink to correct a micro defect in a colored pattern, more preferably from 2% by weight to 15% by weight, and even more preferably from 5% by weight to 9% by weight.

Moreover, the ink to correct a micro defect in a colored pattern of the present invention may also contain a surfactant, a cross-linking agent or the like.

When various surfactants are used in combination, it is possible to prevent the coating surface from having some pointed convexities upon applying the ink or improve dispersing stability of the coloring agent. However, in the present invention, there may be a case that it is preferable not to compound the surfactant in order to keep static surface tension to be hereinafter described within a range to be hereinafter described. As the surfactant, though it is not particularly limited, there may be used an anionic surfactant as typified by alkylnaphthalene sulfonate and phosphate ester salt; a cationic surfactant as typified by amine salt; and an amphoteric surfactant as typified by aminocarboxylic and betaine types.

The amount of the surfactant may be preferably from 0.01% by weight to 2% by weight in the ink to correct a micro defect in a colored pattern, more preferably from 0.01% by weight to 0.5% by weight, and even more preferably from 0.01% by weight to 0.1% by weight.

The cross-linking agent, if used, improves solvent resistance and heat resistance of a corrected portion. Especially, a silanes cross-linking agent improves adhesion of a corrected portion.

The cross-linking agent may not particularly be limited if it has effect of curing the monomer and polymer used in the present invention. There may be preferably used hydrolysate or condensate of aminoalkyl polyhydric alkoxysilane or aminoaryl polyhydric alkoxysilane. Also, there may be preferably used a reacted product obtained by reacting aminoalkyl polyhydric alkoxysilane, aminoaryl polyhydric alkoxysilane, or hydrolysate or condensate thereof with polybasic carboxylic acid or polybasic carboxylic dianhydride or the like; and metal chelate or the like.

The amount of cross-linking agent may be preferably from 0.1% by weight to 5% by weight in an ink to correct a micro defect in a colored pattern, more preferably from 0.1% by weight to 3% by weight, and even more preferably from 0.1% by weight to 1.5% by weight.

The correction ink for a micro defect in a colored pattern of the present invention can be produced in various processes. For example, there is a process, wherein a coloring agent, monomer having reactivity functional group, polymer, a solvent and other components are mixed at the same time and dispersed. There is also a process, wherein each component is individually and preliminary mixed and then these individual preliminary prepared materials are mixed. For example, there is a process, wherein a solvent and a coloring agent are mixed and dispersed, and then the dispersed liquid of the coloring agent is mixed with a solution containing polymer and monomer having reactivity functional group.

In the case that black ink is prepared in combination of three coloring agents, namely red, yellow, and blue, the dispersed liquid of the coloring agent may be obtained in the way that the solvent and three colors of coloring agents are mixed at the same time and dispersed, or dispersed liquids of each three colors of coloring agents are prepared and then mixed.

From various kinds of process for production, it is preferred to select an appropriate one mainly in accordance with kind of the coloring agent. However, in the present invention, it is preferable to produce by substituting partial function of the solvent at the time of production with monomer having reactivity functional group since an amount of the solvent is relatively small. In this case, polymer and monomer having reactivity functional group are preliminary mixed and blended to obtain the varnish, and the solvent and the coloring agent are preliminary mixed to obtain the dispersed liquid of the coloring agent. Then, the varnish and the dispersed liquid of the coloring agent are mixed and the viscosity thereof is adjusted by the solvent or the like to produce the ink. Above mentioned and other optional components may be accordingly compounded so as to express their function.

In the process for production of the ink to correct a micro defect in a colored pattern of the present invention, the dispersing method of the coloring agent in the ink or in the dispersed liquid of the coloring agent may not be limited and may be applied various methods such as publicly known dispersing machines or the like, for instance, a kneader, a roll mill, an at liter, a super mill, a dissolver, a homo mixer, a sand mill or the like.

The particularly suitable process for production provided in the present invention is a process for production of the ink to correct a micro defect in a colored pattern containing at least a coloring agent, monomer having reactivity functional group, polymer and a solvent, wherein an amount of the solvent is from 25% by weight to 70% by weight of the whole ink, and it is characterized by comprising steps of:

preparing coloring agent dispersion by dispersing the coloring agent in the solvent;

preparing varnish by mixing the monomer having reactivity functional group and the polymer; and mixing the prepared coloring agent dispersion with the varnish.

There is provided the steps of: preparing the coloring agent dispersion by dispersing the coloring agent in the solvent; preparing the varnish by mixing the monomer having reactivity functional group and the polymer; and mixing the prepared coloring agent dispersion and the varnish. Therefore, even in the case of producing an ink in which the amount of the solvent is small and limited to 25% by weight to 70% by weight of the whole ink, an ink having sufficiently good disperse condition of the coloring agent and having physical property like viscosity or the like suitable for the ink to correct a micro defect in a colored pattern can be produced. That is enabled by dispersing the coloring agent well using the solvent, and then separately solving polymer by using monomer having reactivity functional group in place of the solvent to prepare the varnish.

In the process of production of the ink, in order to produce the ink having physical property such as suitable viscosity or the like for correction of a small defect in a colored pattern and having small amount of the solvent, all solvents may be used upon preparing colored dispersion and adjusting final concentration of the ink. In this case, in preparation of the varnish, the solvent is practically not used. Thus, aforementioned monomer having reactivity functional group is alternatively is used in place of the solvent to dissolve polymer or the like.

In the process of preparing dispersion of the coloring agent, preparation may be carried out in such manner that the coloring agent, the pigment dispersant, if necessary, polymerization initiator or the like, if necessary, are mixed in the solvent in any order and dispersed by publicly known dispersing means such as a kneader, a roll mill, an at liter, a super mill, a dissolver, a homo mixer, a sand mill, a paint shaker or the like. Among them, a dispersing method by means of a paint shaker using beads may be preferable as it prevents over-dispersion.

Generally, dispersion of the coloring agent is prepared by mixing and dispersing the coloring agent in the solvent in which the pigment dispersant is preliminary solved or dispersed, or by mixing and dispersing the coloring agent and the pigment dispersant simultaneously in the solvent, and then mixing the polymerization initiator or other components.

In the case that several kinds of coloring agents are used to attain color, it may mix several kinds of coloring agents with other components at the same time to prepare one coloring agent dispersion. However, it may also prepare a coloring agent dispersion containing several coloring agents in the following manner: after preparing dispersion for each coloring agent using pigment dispersant, each dispersion of the coloring agent is mixed; and then the polymerization initiator or other components are added, if necessary. The solvent, the pigment dispersant or other compounding components may be different or same depending on the coloring agent dispersion of each coloring agent.

In the process of preparing the varnish, there is a limit in the amount of the solvent as mentioned above, monomer having reactivity functional group is used as a medium for solving polymer. If it is possible to compound the solvent in the varnish, both solvent and monomer having reactivity functional group may be used to solve polymer. If it is not possible to compound the solvent at all in the varnish, only monomer having reactivity functional group may be used to solve polymer.

In the process of preparing the varnish, monomer having reactivity functional group may be compounded as an essential component, therefore, it is preferable to compound the polymerization inhibitor as it prevents gelation of the varnish and the produced ink, and improves stability during preservation. Polymerization inhibitor to be compounded in the ink may be compounded all or partially at the varnish preparing step.

In the process of preparing the varnish, the monomer, the polymer, the polymerization initiator or the like, if necessary, and the solvent, if it is possible to use, may be mixed in any order with agitation, if necessary, to solve polymer and prepare the varnish. As mixing mean, the publicly known dispersing means such as a kneader, a roll mill, an at liter, a super mill, a dissolver, a homo mixer, a sand mill, a paint shaker or the like may be used as same as for the dispersion of the coloring agent. In this case, since the monomer has liquidity and polymer is generally solid, it is preferable to add polymer little by little to mix by agitating monomer having reactivity functional group. Upon solving polymer, the polymer may be heated. In view of promoting dissolution without thermosetting reaction, temperature of heating is preferably 70° C. to 200° C., more preferably 90° C. to 150° C. Time of heating is preferably 30 minutes to 4 hours, more preferably 30 minutes to 2 hours. As for timing of heating, heating upon applying polymer in monomer having reactivity functional group is preferably avoided in regard to preventing generation of agglomerate. It is preferable to heat and solve after polymer is mixed into monomer having reactivity functional group.

When it is preferable to heat in order to solve polymer, in the process of preparing the varnish, it is preferable that monomer having reactivity functional group is photo curable resin as it is possible to heighten heating temperature.

In the process of preparing the varnish, it is preferable to confirm degree of solubility of polymer in order to obtain the correction ink superior in physical property after cured and coating property. The means to confirm the solubility may be, for example, applying a prepared varnish on glass to see presence or absence of solid particle or the like. In this case, it is preferable to dissolve until solid particle can not be seen.

Upon preparing a varnish, monomer having reactivity functional group and the solvent may be further added to the preliminary prepared varnish to obtain newly prepared varnish in order to adjust viscosity suitable to each correction ink.

Upon compounding the solvent to the varnish, it may be same or different from the solvent used for aforementioned dispersion of the coloring agent. In view of stability of the ink, it is preferable to use the same solvent.

Said process of preparing dispersion of the coloring agent and said process of preparing the varnish may be conducted in any order.

Thereafter, a process to mix said prepared coloring agent dispersion with said varnish is carried out. They may be mixed in the same manner as for the coloring agent dispersion by means of publicly known dispersing means such as a kneader, a roll mill, an at liter, a super mill, a dissolver, a homo mixer, a sand mill, a paint shaker or the like. They may be mixed in any order, however, when two or more coloring agent dispersions are used, it is preferable to mix the varnish after the coloring agent dispersions are mixed.

After mixing the coloring agent dispersion and the varnish, final concentration of the ink may be adjusted by adding proper amount of the solvent.

Thus obtained ink to correct a micro defect in a colored pattern may preferably have solid content concentration from 30% by weight to 75% by weight, more preferably from 45% by weight to 75% by weight, and even more preferably from 50% by weight to 70% by weight.

The concentration of the coloring agent in solid content may preferably be from 5% by weight to 40% by weight, more preferably from 10% by weight to 35% by weight, and even more preferably from 15% by weight to 35% by weight.

The concentration of the binder component in solid content may preferably be from 30% by weight to 85% by weight, more preferably from 35% by weight to 80% by weight, and even more preferably from 40% by weight to 75% by weight.

The solid content concentration herein means % by weight of net weight of content in the ink apart from the solvent, i.e., coloring agent, monomer having reactivity functional group, polymer and any other optional components, against total amount of the ink. The concentration of the coloring agent in solid content is expressed by % by weight of the coloring agent against weight of solid content in the ink. The concentration of the binder component in solid content is expressed in % by weight of the binder component (i.e., in the present invention, a total amount of monomer having reactivity functional group and polymer) against weight of solid content in the ink.

In the ink produced in the present invention, monomer having reactivity functional group is compounded which can partially be substituted for solvent so that the content of the solvent in the ink can be reduced, therefore, the solid content concentration tends to be high. Thereby, since the volatilizing amount of the solvent decreases, physical stability such as viscosity or the like of the ink at the time of preserving and using is improved, and volume decrease rate due to volatilization of the solvent after applying ink becomes small. The small volume decrease rate makes it possible to sufficiently thicken the layer thickness of a color omission portion where the ink is supplied with small deposition amount of the ink, thereby relieving the bother of applying the ink repeatedly. It can also avoid forming of a new protrusion and emergence of a color mixing defect since the imparted ink drop is small in area even before drying and not likely to run off to the surroundings.

The concentration of the binder component in solid content of the ink of the present invention tends to be high because monomer having reactivity functional group which can partially be substituted for the solvent becomes binder component after curing. Therefore, adhesive property of a coating layer to the substrate after drying is good and solvent resistance and heat resistance of corrected portion is high.

The viscosity of an ink to correct a micro defect in a colored pattern of the present invention may preferably be from 40 to 300 mPa·sec, more preferably from 50 to 150 mPa·sec, and even more preferably from 55 to 90 mPa·sec.

If the viscosity of the ink is too low, the applied spot is expanded to have blur leading to a color mixing defect. On the other hand, if the viscosity of the ink is too high, the layer thickness of applied spot is thicker and the color is dense but a surface of applied spot may be not smooth shaped and height of protrusion may be larger.

If the viscosity of the ink is in said range, the applied spot becomes smooth shape, blur does not emerge, and the projecting height shall be within an acceptable range.

It is preferable to adjust viscosity of the ink by controlling an amount of the solvent to be added.

The viscosity of the ink in the present invention is determined by measuring for one minute at 25° C. by means of a B-type viscosity meter (for example, trade name: VISCOMETER TV-20, available from TOKIMEC) with BL adopter, M1 rotor or M2 rotor.

The relationship between rate of shear γ and stress of shear τ can be expressed by the following formula (1).

$$\tau = K\gamma^L \quad \text{formula (1)}$$

wherein $0.081 \leq K \leq 0.111$, $0.881 \leq L \leq 0.954$

For the rate of shear γ and stress of shear τ of the correction ink in the present invention, viscoelasticity is measured by means of a rheometer (measuring device for viscoelasticity) (for example, trade name: ARES100, available from Rheometric Scientific F. E.), and the relationship between the rate of shear γ and stress of shear τ is calculated therefrom. The relationship is plotted by log-log scale and an approximate expression of the plotting is calculated to determine slope of formula (1).

It is preferable to have the ink to correct a micro defect in a colored pattern of the present invention that τ value is 0.3 to 1.3 when γ value is 10 and τ value is 4.0 to 10.0 when γ value is 100 in regard to coating property of the ink.

Further, it is preferable to have the ink that τ value is 0.3 to 10.0 when γ value is 10 to 100 having slope of 0.075 to 0.15 and degree of 0.8 to 1.1 in regard to coating property of the ink.

There is a merit for the ink with rate of shear and stress of shear within the range as mentioned above that the ink is easy to adhere on the end of a needle when the ink is applied on a color omission portion using a needle-shaped medium.

Static surface tension of the ink to correct a micro defect in a colored pattern in the present invention at 25° C. is preferably 20 mN/m to 45 mN/m, more preferably 25 mN/m to 35 mN/m, and even more preferably 25 mN/m to 32 mN/m.

The static surface tension herein is determined by means of a surface tension balance (for instance, trade name: DIGI-O-MATIC ESB-IV, available from Kyowa Chemical Industry Co., Ltd.) in such manner that 30 mL ink is took on a small petri dish (diameter of 5 cm), and static surface tension at one minute elapsing after a platinum plate is brought into contact therewith.

There is a merit for the ink with static surface tension within the range as mentioned above that the ink does not spread from the applied spot, does not make blur leading to a color mixing defect and does not make a new protrusion.

In the case of a correcting black ink, when layer thickness of coating layer obtained by curing a black ink is 1.9 μm or less, it is preferable to have optical density of 1.0 or more, more preferably 1.2 or more, and even more preferably 1.4 or more. A defect portion corrected with the black ink which satisfies said condition is indistinctive and has sufficient masking effect.

Next, a correcting method using the ink to correct a micro defect in a colored pattern of the present invention will be explained.

Hereunder, correction of a color filter for a liquid crystal display is exemplified to explain a typical application of the correcting ink of the present invention though other small defect in a colored pattern can also be corrected similarly with some necessary changes.

The outline of color filter production process is generally as follows: a black matrix is formed onto a transparent substrate; and then pixel patterns of R, G, B or the like are formed for each color. As pixel pattern, there may be used stripe type, mosaic type, triangle type, four pixel layout type, island type such as "<" shaped layout or the like. If necessary, a protective layer may be formed on the pixel pattern and further a transparent conductive layer may be layered thereon to make a color filter.

Pattern correction using the ink to correct a micro defect in a colored pattern of the present invention may be conducted at any point of the color filter production process. That means, the correction may be conducted at each time after forming process of one color by using paste corresponding to the color in such manner that: after forming black matrix, black matrix is corrected; then after forming of one color from RGB, corresponding color is corrected. Or the correction may be conducted after all forming is finished such as black matrix and RGB stripe. However, correction after forming protective layer or transparent conductive layer makes defect of protective layer and transparent conductive layer at the corrected portion, therefore, correction is generally done before forming the protective layer or the transparent conductive layer.

Kind of defects in pattern to be corrected with the correction ink of the present invention may not be limited. For example, a black defect such as a defect caused by adherence of foreign substance or a dense color defect caused by pigment aggregation are volatilized at defect portion by laser or the like. At this stage, it becomes white defect with color omission, therefore, the correction ink of the present invention is applied and corrected. White defect such as a color omission defect or the like is corrected by directly applying the correction ink of the present invention.

When correction is carried out with the use of the correction ink of the present invention, the corrected portion has sufficiently small difference in level from a surface of the normal pixel portion. Thus, product imperfection or the like due to a new protrusion will not emerge when the liquid crystal display panel is fabricated. Further, the ink will not spread from the applied spot after the ink is applied so that there is not caused a color mixing defect due to blur nor a noticeable corrected portion due to spreading of corrected area.

As applying method of the correction ink of the present invention, there may be not particularly limited. The method disclosed in Japanese Patent Laid-open Publication No. Hei. 8-182949, in which an ink is made to adhere on a needle-shaped coating medium, and then it is applied on a micro defect in a colored pattern, is preferable because it is adaptable for a micro correcting spot. If the end of the needle-shaped material (where ink is carried) is processed as flat surface, it is preferable since it prevents a micro defect portion in a colored pattern from damaging due to contacting of the needle-shaped material. It is further preferable to change diameter of the end of the needle-shaped coating medium in accordance with size of a defect to be corrected since it becomes adaptable for a defect in various size.

After applying the correction ink of the present invention, it is not necessary to dry. If drying, the method is not particularly limited, for example, air drying, heat drying, vacuum drying or the like. In the case of heat drying, an oven, a hotplate or the like are preferably used in the range of 50 to 300° C. for 1 minute to 3 hours. Upon correction, drying in a small area for short time is often required, therefore, a method to heat and dry at only a corrected portion by means of, for example, an infrared spot heater, etc. is preferably adapted.

It is preferable to provide a process of light radiation after applying the ink to correct a micro defect in a colored pattern on a micro defect portion in a colored pattern in the case that the correction ink of the present invention contains monomer or polymer having photo reactive function group, because it is possible to primary cure a surface of corrected portion quickly or to cure whole correcting portion in short time. It is preferable to primary cure the surface of correcting portion quickly as there is a merit of being able to stop liquidity of ink at once that a shape of the ink at the corrected portion is stabilized. Curing in short time by heating process may cause sublimation of the coloring agent or heat corruption of a defect portion. Such demerits are unlikely to happen in light radiation.

In the case that the ink to correct a micro defect in a colored pattern of the present invention contains monomer or polymer having thermal reactive function group, heating process may be provided after the correction ink is applied to a defect portion. More preferably, heating process is provided after light radiation.

A color filter having performances equal to that of a zero defects can be produced by the method described above, in which a micro defect portion in the colored pattern is corrected by filling with a cured product of the ink to correct a micro defect in a colored pattern of the present invention, and if necessary, an over coat layer, a protective layer or a transparent conductive layer may be formed for smoothing a coated portion.

In the case of using the correcting black ink for a micro defect in a colored pattern, the similar way is carried out. The correcting black ink of the present invention is preferably used for correcting a black matrix portion of a color filer for a liquid crystal display. However, it may be also used for correcting other micro defects in a black colored pattern other than the black matrix with some necessary changes accordingly.

Pattern correction using the correcting black ink of the present invention may be carried out at any time of a color filter producing process. That means after forming a black matrix, the black matrix may be corrected and forming of RGB may follow. Or after all forming, i.e. the black matrix and RGB stripe, are finished, the black matrix may be corrected. If correction is conducted after forming a protective layer or a transparent conductive layer, the protective layer and the transparent conductive layer at the corrected portion may be damaged, thus it is general to correct before forming the protective layer or the transparent conductive layer.

In the case of correcting with the use the correcting black ink of the present invention, the corrected portion has sufficiently small difference in level from a normal pixel portion. Thus, product imperfection due to a new protrusion will not emerge when a liquid crystal display panel is fabricated.

Further, the ink will not spread from the applied spot after the ink is applied so that there is not caused a color mixing defect due to blur nor a noticeable corrected portion due to spreading of corrected area.

The correcting black ink of the present invention does not contain carbon black, therefore, even when a new protrusion is formed at the corrected portion, it is possible to avoid having electric conduction due to contact between the opposed substrate and the protrusion.

The color filter corrected with the ink to correct a micro defect in a colored pattern of the present invention is used for a display panel component of a personal computer, a word processor, an engineering work station, a navigation system, a liquid crystal television and a video. It may also be suitable for a component of a liquid crystal projection having clear picture quality or the like.

As the color filter of the present invention, the difference in level between the corrected portion by said correction ink for a micro defect in a colored pattern and the surroundings thereof is preferred to be small in view of smoothness. Taking the balance with coloring density into consideration, it may be preferable to have difference in level between the corrected portion by said correction ink for a micro defect in a colored pattern and the surroundings thereof as $-3$ μm to $+5$ μm, more preferably $-2$ μm to $+3$ μm, and even more preferably $-1$ μm to $+2$ μm.

It is preferable to have the difference in level in said range because layer thickness of a filled portion in a color omission portion may be sufficiently thick, coloring of the filled portion may be sufficient and new protrusion may not emerge to avoid causing product imperfection.

In a case of a color filter corrected with the correcting black ink of the present invention, the color filter can obtain sufficient masking effect with optical density of 1.0 or more, more preferably 1.2 or more, and even more preferably 1.4 or more, when the layer thickness of the corrected portion corrected by the cured product of the correcting black ink is 1.9 μm or less.

According to the present invention, it may be possible to obtain the correction ink for a micro defect of a colored pattern in which it can avoid forming of new controversial protrusion when the ink is applied to the color omission portion of the white defect, and it can avoid spreading an overlapping area of the applied spot onto the normal color pixel portion due to spreading of the applied spot after coating. Further, it may be possible to obtain the ink in which physical stability such as viscosity or the like of the ink at the time of preserving and using is improved, volume decrease rate after applying the ink becomes small, and it is possible to sufficiently thicken the layer thickness of the color omission portion where the ink is supplied.

when the defect portion in the colored pattern is corrected by using the correction ink of the present invention, the corrected portion has sufficiently small difference in level from the normal pixel portion. Thus, product imperfection due to a new protrusion will not emerge when the liquid crystal display panel is fabricated. Further, since the ink will not spread from the applied spot after the ink is applied, there is caused neither color mixing defect due to blur and spreading of the ink nor a noticeable corrected portion due to spreading of the area of the corrected portion.

The color filter corrected with the correction ink for a micro defect in a colored pattern of the present invention has performances comparable to zero defects product, therefore, it has effect to improve yield ratio and not to damage productivity even if a defect portion is generated.

Notably, the correcting black ink provided by the present invention does not use the carbon black as the coloring agent. Instead, the black color is made by mixing three coloring agents, namely red, yellow and blue. Therefore, the black ink is suitably used for correcting black pattern because it has suitable coating property for correcting micro defect portion in colored pattern, it is not likely to have electric conduction and it is possible to obtain the black color with high optical density. The correcting black ink of the present invention can prevent the corrected portion from being noticeable even in a case of correcting the defect in the black matrix which requires black color of extremely high density.

EXAMPLE

Example A series illustrates merits of the correction ink of the present invention. Example B series particularly focuses on the correcting black ink. The following examples aim to simplify understanding of the present invention and do not intend to limit the claims of the present invention.

Example A Series

Production Examples A1 to A6

Preparation of Pigment Dispersed Liquid

In accordance with the amount shown in Table A1, a coloring agent, a pigment dispersant and a solvent were weighed and mixed. The mixed liquid was dispersed for 3 hours by means of paint shaker (trade name: PAINT SHAKER, available from Asada Tekko Co., Ltd.) using zirconia beads (0.3 mm ø) (trade name: Microhyca Z Z300, available from Showa Shell Sekiyu K.K.) to obtain a pigment dispersed liquid.

TABLE A1

|  |  | Production Example % by weight | | | | | |
|---|---|---|---|---|---|---|---|
|  |  | A1 | A2 | A3 | A4 | A5 | A6 |
| Pigment | C.I. Pigment Red 254 *1 | 22.0 | | | | | |
|  | C.I. Pigment Yellow 139 *2 | | 30.0 | | | | |
|  | C.I. Pigment Green 36 *3 | | | 35.0 | | | |
|  | C.I. Pigment Yellow 150 *4 | | | | 25.0 | | |
|  | C.I. Pigment Blue 15:6 *5 | | | | | 24.0 | |
|  | C.I. Pigment Violet 23 *6 | | | | | | 23.0 |
| Dispersant | Polyester-base high molecular weight pigment-dispersant *7 | 9.0 | 9.0 | 14.0 | 15.0 | 10.0 | 16.0 |
| Solvent | methoxypropyl acetate *8 | 69.0 | 61.0 | 51.0 | 60.0 | 66.0 | 61.0 |

*1 IRGAFORE RED B-CF (available from Ciba Specialty Chemicals)
*2 Paliotol yellow 1970 (available from BASF)
*3 Monastral green 6YC-L (available from Avecia KK)
*4 Fanchonfast Yellow Y5688 (available from Bayer Co. Ltd.)
*5 Lionol Blue ES (available from Toyo Ink MFG. Co., Ltd.)
*6 Lionogen Violet RL (available from Toyo Ink MFG. Co., Ltd.)
*7 Solsperse 24000 GR (available from Avecia KK)
*8 Available from Daicel Chemical Industries, Ltd.

Production Example A7

Production of Varnish

In accordance with the amount shown in Table A2, polymer was added little by little into monomer having reactivity functional group while being agitating. The polymerization inhibitor was added therein and mixed. After mixing, the mixture was heated at 110° C. for 30 minutes to 1 hour being agitated. As the result, polymer and polymerization inhibitor were solved into monomer having reactivity functional group, thus obtained a primarily prepared varnish.

TABLE A2

| | Production Example A7 | % by weight |
|---|---|---|
| Polymer | diallylphthalate prepolymer *9 | 15.85 |
| Monomer having reactivity functional group | dipentaerythritolhexaacrylate *10 | 84.10 |
| Polymerization inhibitor | methylhydroquinon *11 | 0.05 |

*9 Weight average molecular weight 50000 to 60000, trade name: Daiso dap A (available from Daiso Co., Ltd.)
*10 Kayarad DPHA (available from Nippon Kayaku Co. Ltd.)
*11 Available from Seiko Chemical Co., Ltd.

Example A1 to A8

There were prepared Example A1, which is a transparent correction ink for RED, Example A2, which is a transparent correction ink for GREEN, Example A3, which is a transparent correction ink for BLUE, Example A4, which is another transparent correction ink for BLUE, Example A5, which is a transparent correction ink for a black matrix, Example A6, which is a reflective correction ink for RED, Example A7, which is a reflective correction ink for GREEN and Example A8, which is a reflective correction ink for BLUE.

In accordance with the amount shown in Table A3, the primary pigment dispersed liquid obtained in Production Examples A1 to A6, a polymerization initiator and the solvent were mixed. Thereby, the polymerization initiator was solved, thus obtained a secondary pigment dispersed liquid. Next, the primary varnish obtained in Production Example A7 and monomer having reactivity functional group were mixed and solved to obtain a secondarily prepared varnish. These secondary pigment dispersed liquid and secondarily prepared varnish were mixed and viscosity was measured by a viscosity measurement method to be hereinafter described. If necessary, the solvent was further added to adjust the viscosity. The composition of each of the obtained ink to correct a micro defect in a colored pattern is shown in Table A4.

TABLE A3

| | | Example | | | | | | | |
|---|---|---|---|---|---|---|---|---|---|
| | | A1 | A2 | A3 | A4 | A5 | A6 | A7 | A8 |
| Pigment dispersed liquid | Production Example A1 | 52.0 | | | | | 26.5 | 31.5 | |
| | Production Example A2 | 8.5 | | | | 10.0 | 5.0 | 12.5 | |
| | Production Example A3 | | 41.0 | | | | | 8.0 | |
| | Production Example A4 | | 27.0 | | | | | | |
| | Production Example A5 | | | | 48.0 | 32.0 | 24.5 | | 37.0 |
| | Production Example A6 | | | | | 13.0 | | | |
| Varnish | Production Example A7 | 18.0 | 16.0 | 24.0 | 24.0 | 19.5 | 26.5 | 30.5 | 28.0 |
| Monomer | dipentaerythritolhexaacrylate *10 | 12.5 | 11.0 | 16.5 | 17.0 | 13.5 | 19.0 | 21.5 | 19.5 |
| Polymerization initiator | acetophenones initiator *12 | 4.0 | 3.0 | 7.5 | 7.5 | 4.0 | 8.0 | 9.0 | 8.5 |
| | thioxanthones initiator *13 | 1.0 | 1.5 | | | 1.5 | | | |
| Solvent | methoxypropylacetate *8 | 4.0 | 0.5 | 4.0 | 6.5 | 0.5 | 10.0 | 18.5 | 7.0 |

*12 IRGACURE 907 (available form Ciba Specialty Chemicals)
*13 KAYACURE DETX-S (available form Nippon Kayaku Co. Ltd.)

TABLE A4

| | | Examples % by weight | | | | | | | |
|---|---|---|---|---|---|---|---|---|---|
| | | A1 | A2 | A3 | A4 | A5 | A6 | A7 | A8 |
| Coloring agent | C.I. Pigment Red 254 *1 | 11.44 | | | | | 5.86 | 6.95 | |
| | C.I. Pigment Yellow 139 *2 | 2.51 | | | | | 2.93 | 1.53 | |
| | C.I. Pigment Green 36 *3 | | 14.29 | | | | | 4.39 | |
| | C.I. Pigment Yellow 150 *4 | | 6.72 | | | | | 2.07 | |
| | C.I. Pigment Blue 15:6 *5 | | | 11.54 | 7.70 | 5.86 | | | 8.87 |
| | C.I. Pigment Violet 23 *6 | | | | 2.97 | | | | |
| Pigment dispersant | Polyesters-base high molecular weight pigment-dispersant *7 | 5.33 | 9.75 | 4.62 | 5.16 | 5.56 | 3.23 | 3.00 | 3.55 |
| Polymer | diallylphthalate prepolymer *9 | 2.83 | 2.55 | 3.79 | 2.67 | 3.07 | 4.22 | 4.88 | 4.41 |
| Monomer | dipentaerythritolhexaacrylate *10 | 27.52 | 24.87 | 36.86 | 38.26 | 29.89 | 41.06 | 47.43 | 42.84 |
| Polymerization initiator | acetophenones initiator *12 | 3.75 | 3.39 | 7.18 | 7.23 | 4.07 | 8.00 | 9.22 | 8.33 |
| | thioxanthones initiator *13 | 1.61 | 1.45 | | | 1.75 | | | |
| Polymerization inhibitor | methylhydroquinon *11 | 0.01 | 0.01 | 0.01 | 0.01 | 0.01 | 0.01 | 0.01 | 0.01 |
| Solvent | methoxypropylacetate *8 | 45.00 | 36.97 | 36.00 | 36.00 | 41.00 | 35.00 | 29.00 | 31.99 |

Comparative Example A1

15 g of IRGAFORE RED B-CF (available from Ciba Specialty Chemicals) as a coloring agent was mixed with 12 g of 50% solution of Solsperse 24000 GR (available from Avecia KK) as a pigment dispersant in methoxypropyl acetate (available from Daicel Chemical Industries, Ltd.), and the pigment was dispersed by a roll mill. Then it was diluted by 73 g of methoxypropyl acetate (available from Daicel Chemical Industries, Ltd.) to prepare a red pigment dispersed liquid. Similarly, 15 g of Paliotol yellow 1970 (available from BASF) as a coloring agent was mixed with 9 g of 50% solution of Solsperse 24000 GR (available from Avecia KK) as a pigment dispersant in methoxypropyl acetate (available from Daicel Chemical Industries, Ltd.), and the pigment was dispersed by a roll mill. Then it was diluted by 76 g of methoxypropyl acetate to prepare a yellow pigment dispersed liquid. Also, 44.3 g of 40% solution of methacrylic acid copolymer (trade name: Excedic Binder LE-0939, available from Dainippon Ink and Chemicals incorporated), 14.5 g of Kayarad DPHA (available from Nippon Kayaku Co. Ltd.) as monomer, 6.3 g of IRGACURE 907 (available from Ciba Specialty Chemicals) as a polymerization initiator and 1.5 g of KAYACURE DETX-S (available from Nippon Kayaku Co. Ltd.) as a polymerization initiator were solved in 33.4 g of methoxypropyl acetate (available from Daicel Chemical Industries, Ltd.) to prepare a varnish. 25.15 g of the red pigment dispersed liquid, 5.52 g of the yellow pigment dispersed liquid and 34.11 g of the varnish were mixed, to which 35.22 g of methoxypropyl acetate (available from Daicel Chemical Industries, Ltd.) was added to dilute, thereby preparing a colored resist for a color filter.

Comparative Example A2

15.79 g of IRGAFORE RED B-CF (available from Ciba Specialty Chemicals) as a coloring agent, 3.46 g of Paliotol-yellow 1970 (available from BASF) as a coloring agent, 14.70 g of 50% solution of Solsperse 24000 GR (available from Avecia KK) as a pigment dispersant in methoxypropyl acetate (available from Daicel Chemical Industries, Ltd.), 29.85 g of ethyl cellulose (available from Dow Chemical Corporation), 12.79 g of Kayarad DPHA (available from Nippon Kayaku Co. Ltd.), 7.75 g of IRGACURE 907 (available from Ciba Specialty Chemicals) as a polymerization initiator and 15.60 g of Tepineol (available from Yasuhara Chemical Co., Ltd.) were mixed, and the pigment was dispersed by a roll mill to prepare a printing ink for forming a colored layer of a color filter.

Evaluation Method of Example A Series (1) Viscosity, Rate of Shear $\gamma$, Stress of Shear $\tau$, Slope of Formula (1)

The viscosity of the ink was determined by measuring for one minute at 25° C. by means of a B-type viscosity meter (trade name: VISCOMETER TV-20, available from TOKIMEC) with BL adopter, M1 rotor and M2 rotor.

As for the rate of shear $\gamma$, stress of shear $\tau$ and slope of formula (1), viscoelasticity was measured by means of a rheometer (measuring machine for viscoelasticity) (trade name: ARES 100, available from Rheometric Scientific F. E.) and the relationship between the rate of shear $\gamma$ and stress of shear $\tau$ were calculated therefrom. The relationship was plotted by log-log scale, and an approximate expression was calculated to obtain slope of formula (1). The graph plotting rate of shear and stress of shear by logarithmic scale of the ink to correct a micro defect in a colored pattern (Example A1) and the graph showing the measuring result of viscosity when rate of shear was changed are shown in FIG. 1.

(2) Static Surface Tension

Static surface tension herein was determined by means of a surface tension balance (trade name: DIGI-O-MATIC ESB-IV, available from Kyowa Chemical Industry Co., Ltd.) in such manner that 30 mL ink is took on a small petri dish (diameter of 5 cm), and static surface tension at one minute elapsing after a platinum plate is brought into contact therewith.

(3) Measuring Difference in Level of Corrected Portion and Evaluation Thereof

Difference in level of the corrected portion was determined by measuring difference in depth of focus of microscope by means of an ultra-deep figure measuring microscope (trade name: VK8510, available from Keyence Corporation) F and by measuring layer thickness by means of a stylus type figure measuring machine (trade name: P-1 Long Scan Profiler, available from KLA-Tencor Corporation). The result was evaluated as no-good when the difference was 6 μm or more since it is not preferable for correcting the color filter.

(4) Visual Evaluation of Corrected Portion

The corrected color filters were placed on a back light to observe the corrected portion and they were decided pass or fail. In the case that the corrected portion was visually acknowledged since the corrected area excessively spread due to blur of ink or the color was too light, the result was evaluated as not good.

(5) Chemical Resistance Test of Corrected Portion

After the corrected portion was soaked in isopropyl alcohol, N-methylpyrrolidone and γ-butyrolactone respectively for 30 minutes at room temperature, it was rinsed in water, dried by cut water, and then observed with microscope. If there was no damage such as peeling, crack or the like, it was evaluated as pass.

For Examples A1 to A8 and Comparative examples A1 and A2, the above obtained viscosity, rate of shear $\gamma$, stress of shear $\tau$, slope of formula (1) and static surface tension together with concentration of the solid content calculated from the ink composition, concentration of the coloring agent in solid content, concentration of the binder component in solid content, the measured height of protrusion, the result of visual evaluation of corrected portion and the result of chemical resistance test are shown in Table A5.

TABLE A5

|  | Example | | | | | | | | Comparative Example | |
| --- | --- | --- | --- | --- | --- | --- | --- | --- | --- | --- |
|  | A1 | A2 | A3 | A4 | A5 | A6 | A7 | A8 | A1 | A2 |
| Viscosity (mPa·sec) | 65 | 70 | 70 | 70 | 75 | 90 | 90 | 90 | 5 | 400000 |
| Stress of shear τ when rate of shear γ = 10 | 0.65 | 0.70 | 0.75 | 0.80 | 0.85 | 0.70 | 0.70 | 0.75 | 0.05 | 470 |
| Stress of shear τ when rate of shear γ = 100 | 5.0 | 6.0 | 6.5 | 6.5 | 6.5 | 6.5 | 6.5 | 6.0 | 0.5 | 2200 |
| Slope of formula (1) | 0.089 | 0.080 | 0.080 | 0.100 | 0.110 | 0.075 | 0.080 | 0.080 | 0.006 | 100 |
| Static surface tension (mN/m) | 30 | 30 | 30 | 30 | 30 | 30 | 30 | 30 | 25 | 50 |
| Solid content density (% by weight) | 55.00 | 63.00 | 64.00 | 64.00 | 59.00 | 65.00 | 71.00 | 68.00 | 20 | 77 |
| Coloring agent concentration in solid content (% by weight) | 25.36 | 28.57 | 18.03 | 16.67 | 24.83 | 13.04 | 9.01 | 13.04 | 23 | 25 |
| Binder component concentration in solid content (% by weight) | 64.88 | 62.65 | 70.75 | 72.04 | 65.31 | 74.64 | 74.80 | 74.68 | 63.27 | 64.93 |
| Measured height of protrusion (μm) | −1.0 | +0.5 | −0.8 | −0.5 | +0.1 | +1.6 | +2.0 | +1.8 | −2.5 | +2.0 |
| Result of visual evaluation of corrected portion | good | good | good | good | good | good | good | good | NG | NG |
| Result of chemical resistance test | pass | pass | pass | pass | pass | pass | pass | pass | fail | fail |

From the results, Examples A1 to A8 had good coating property to the corrected portion and were well corrected regarding all of the following points: the visual observation after correction and curing, the height of protrusion and the chemical resistance. On the other hand, Comparative examples A1 and A2 were not able to correct well.

Example B Series

Production Examples B1 to B3

Preparation of Pigment Dispersed Liquid

In accordance with the amount shown in Table B1, a coloring agent, a pigment dispersant and a solvent were weighed and mixed. The mixed liquid was dispersed for 3 hours by means of a paint shaker (trade name: PAINT SHAKER, available from Asada Tekko Co., Ltd.) using zirconia beads (0.3 mm ø) (trade name: Microhyca Z Z300, available from Showa Shell Sekiyu K.K.) to obtain a pigment dispersed liquid.

TABLE B1

|  |  | Production Example % by weight | | |
| --- | --- | --- | --- | --- |
|  |  | B1 | B2 | B3 |
| Pigment | C.I. Pigment Red 254 *1 | 22.0 | | |
|  | C.I. Pigment Yellow 139 *2 | | 30.0 | |
|  | C.I. Pigment Blue 15:6 *3 | | | 24.0 |
| Dispersant | Polyesters-base high molecular weight pigment-dispersant *4 | 9.0 | 9.0 | 10.0 |
| Solvent | methoxypropyl acetate *5 | 69.0 | 61.0 | 66.0 |

*1 IRGAFORE RED B-CF (available from Ciba Specialty Chemicals)
*2 Paliotol yellow 1970 (available from BASF)
*3 Lionol Blue ES (available from Toyo Ink MFG. Co., Ltd.)
*4 Solsperse 24000GR (available from Avecia KK)
*5 Available from Daicel Chemical Industries, Ltd.

Production Example B4

Production of Varnish

In accordance with the amount shown in Table B2, polymer, monomer having reactivity functional group and a polymerization inhibitor were mixed. The mixture was heated at 110° C. to solve polymer into monomer having reactivity functional group, thus obtained a varnish.

TABLE B2

|  | Production Example B4 | % by weight |
| --- | --- | --- |
| Polymer | diallylphthalate prepolymer *6 | 15.85 |
| Monomer having reactivity functional group | dipentaerythritolhexaacrylate *7 | 84.10 |
| Polymerization inhibitor | methylhydroquinon *8 | 0.05 |

*6 Weight average molecular weight 50000 to 60000, trade name: Daiso dap A (available from Daiso Co., Ltd.)
*7 Kayarad DPHA (available from Nippon Kayaku Co. Ltd.)
*8 Available from Seiko Chemical Co., Ltd.

Example B1

In accordance with the amount shown in Table B3, the pigment dispersed liquid obtained in Production Examples B1 to B3, a polymerization initiator and the solvent were mixed and the polymerization initiator was solved to obtain a new pigment dispersed liquid. Next, the varnish obtained in Production Example B4 and monomer having reactivity functional group were mixed and solved to obtain a new varnish. These pigment dispersed liquid and varnish were mixed and the viscosity was measured by a viscosity measurement method to be hereinafter described. If necessary, the solvent was added to adjust the viscosity. Each composition of the obtained black inks to correct a micro defect in a colored pattern is shown in Table B4.

TABLE B3

| | | Example (% by weight) B1 |
|---|---|---|
| Pigment dispersed liquid | Production Example B1 | 26.5 |
| | Production Example B2 | 10.0 |
| | Production Example B3 | 24.5 |
| Varnish | Production Example B4 | 19.5 |
| Monomer | dipentaerythritolhexaacrylate *7 | 13.5 |
| Polymerization initiator | acetophenones initiator *9 | 4.0 |
| | thioxanthones initiator *10 | 1.5 |
| Solvent | methoxypropyl acetate *5 | 0.5 |

*9 IRGACURE 907 (available form Ciba Specialty Chemicals)
*10 KAYACURE DETX-S (available form Nippon Kayaku Co. Ltd.)

TABLE B4

| | | Example (% by weight) B1 |
|---|---|---|
| Coloring agent | C.I. Pigment Red 254 *1 | 5.86 |
| | C.I. Pigment Yellow 139 *2 | 2.93 |
| | C.I. Pigment Blue 15:6 *3 | 5.86 |
| Pigment dispersant | Polyesters-base high molecular weight pigment-dispersant *4 | 5.56 |
| Polymer | diallylphthalate prepolymer *6 | 3.07 |
| Monomer | dipentaerythritolhexaacrylate *7 | 29.89 |
| Polymerization initiator | acetophenones initiator *9 | 4.07 |
| | thioxanthones initiator *10 | 1.75 |
| Polymerization inhibitor | methylhydroquinon *8 | 0.01 |
| Solvent | methoxypropyl acetate *5 | 41.00 |

Comparative Example B1

20 g of carbon black (trade name: Special Black 250, available from degussa Japan Co., Ltd.) was mixed with 8 g of 50% solution of Solsperse 24000 GR (available from Avecia KK) as a pigment dispersant in methoxypropyl acetate (available from Daicel Chemical Industries, Ltd.), and the pigment was dispersed by a roll mill. Then it was diluted by 72 g of methoxypropyl acetate (available from Daicel Chemical Industries, Ltd.) to prepare a pigment dispersed liquid. Also, 6.00 g of 40% solution of methacrylic acid copolymer (trade name: Excedic Binder LE-0939, available from Dainippon Ink and Chemicals incorporated), 20.10 g of Kayarad DPHA (available from Nippon Kayaku Co. Ltd.) as monomer, 6.00 g of IRGACURE 369 (available from Ciba Specialty Chemicals) as a polymerization initiator and 1.5 g of EAB-F (available from Hodogaya Kagaku Co., Ltd.) as a polymerization initiator were solved in a solvent to prepare a varnish. 41.3 g of the pigment dispersed liquid was mixed with 41.96 g of the varnish. Then, it was diluted by 16.74 g of PGMEA to prepare a colored resist for forming a black matrix.

Comparative Example B2

30.0 g of carbon black (trade name: Special Black 250, available from degussa Japan Co., Ltd.), 7.5 g of 50% solution of Solsperse 24000 GR (available from Avecia KK) as a pigment dispersant and 62.5 g of PGMEA were weighed. Dispersion was carried out in the same way as Production Examples B1 to B3 to obtain a pigment dispersed liquid.

65.55 g of this pigment dispersed liquid was mixed with 4.81 g of IRGACURE 907 (available from Ciba Specialty Chemicals) as a polymerization initiator and 2.06 g of KAYACURE DETX-S (available from Nippon Kayaku Co. Ltd.) as a polymerization initiator and solved to obtain a new pigment dispersed liquid.

13.76 g of the varnish obtained in Production example 4 was mixed with 13.76 g of Kayarad DPHA to obtain a new varnish.

72.42 g of said dispersed liquid, 27.52 g of said varnish and 0.06 g of PGMEA were mixed to obtain a correcting carbon black ink.

Evaluation Method of Example B Series (1) Viscosity, Rate of Shear γ, Stress of Shear τ, Slope of Formula (1)

The viscosity of the ink was determined by measuring for one minute at 25° C. by means of a B-type viscosity meter (trade name: VISCOMETER TV-20, available from TOKIMEC) with BL adopter, M1 rotor and M2 rotor.

Figure 2:
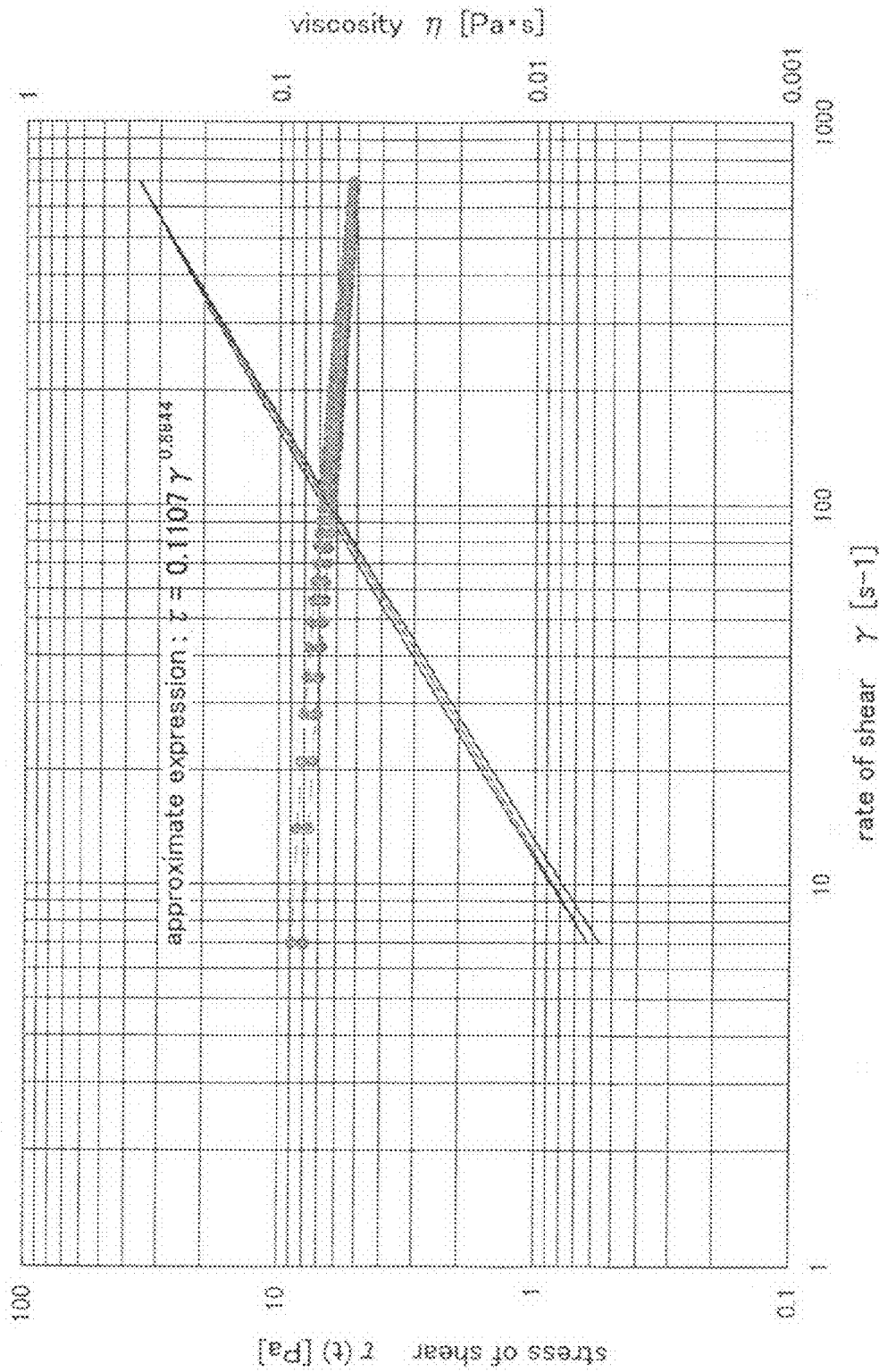
FIG. 2 is a graph plotting rate of shear and stress of shear of a correcting black ink for a micro defect in a colored pattern of the present invention by logarithmic scale and showing one example of viscosity measuring result by changing rate of shear.

As for the rate of shear γ, stress of shear τ and slope of formula (1), viscoelasticity was measured by means of a rheometer (measuring machine for viscoelasticity) (trade name: ARES 100, available from Rheometric Scientific F. E.), and the relationship between the rate of shear γ and the stress of shear τ were calculated therefrom. The relationship was plotted by log-log scale and an approximate expression was calculated to obtain slope of formula (1). The graph plotting rate of shear and stress of shear by Logarithmic scale of the black ink to correct a micro defect in a colored pattern (Example B1) and the graph showing the measuring result of viscosity when rate of shear was changed are shown in FIG. 2.

(2) Static Surface Tension

Static surface tension herein was determined by means of a surface tension balance (trade name: DIGI-O(?)-MATIC ESB-IV, available from Kyowa Chemical Industry Co., Ltd.) in such manner that 30 mL ink is took on a small petri dish (diameter of 5 cm), and static surface tension at one minute elapsing after a platinum plate is brought into contact therewith.

(3) Measuring Difference in Level of Corrected Portion and Evaluation Thereof

Difference in level of the corrected portion was determined by measuring difference in depth of focus of microscope by means of an ultra-deep figure measuring microscope (trade name: VK8510, available from Keyence Corporation), and by measuring layer thickness by means of a stylus type figure measuring machine (trade name: P-1 Long Scan Profiler, available from KLA-Tencor Corporation). The result was evaluated as no-good when the difference was 6 μm or more since it is not preferable for correcting the color filter.

(4) Visual Evaluation of Corrected Portion

The corrected color filters were placed on a back light to observe the corrected portion and they were decided pass or fail. In the case that the corrected portion was visually acknowledged since the corrected area excessively spread due to blur of ink or the color was too light, the result was evaluated as not good.

(5) Chemical Resistance Test of Corrected Portion

After the corrected portion was soaked in isopropyl alcohol, N-methylpyrrolidone and γ-butyrolactone respectively for 30 minutes at room temperature, it was rinsed in water, dried by cutwater, and then observed with microscope. If there was no damage such as peeling, crack or the like, it was evaluated as pass.

For Examples B1 and Comparative examples B1 and B2, the above obtained viscosity, rate of shear γ, stress of shear τ, slope of formula (1) and static surface tension together with concentration of the solid content calculated from the ink composition, concentration of the coloring agent in solid content, concentration of the binder component in solid content, the measured height of protrusion, the result of visual evaluation of corrected portion and the result of chemical resistance test are shown in Table B5.

TABLE B5

|  | Example B1 | Comparative Example B1 | Comparative Example B2 |
| --- | --- | --- | --- |
| Viscosity (mPa · sec) | 75 | 5 | 800 |
| Stress of shear τ when rate of shear γ = 10 | 0.85 | 0.060 | 5.0 |
| Stress of shear τ when rate of shear γ = 100 | 6.5 | 0.6 | 35.0 |
| Slope of formula (1) | 0.110 | 0.0060 | 0.700 |
| Static surface tension (mN/m) | 30 | 25 | 48 |
| Solid content density (% by weight) | 59.00 | 22.5 | 59 |
| Coloring agent concentration in solid content (% by weight) | 24.83 | 36.70 | 33.34 |
| Binder component concentration in solid content (% by weight) | 65.31 | 49.31 | 55.00 |
| Measured height of protrusion (μm) | +0.1 | −2.0 | +2.5 |
| Result of visual evaluation of corrected portion | good | NG | NG |
| Result of chemical resistance test | pass | fail | fail |

From the results described above, Example B1 had good coating property to the corrected portion, and was well corrected regarding all of the following points: the visual observation after correction and curing, the height of protrusion and the chemical resistance. On the other hand, Comparative examples B1 and B2 were not able to correct well.

We claim:

1. A method for correcting a micro defect in a color pattern of a color filter for a display comprising the steps of:
   applying, onto a small defect portion in a colored pattern of a color filter for a display, a correction ink for micro defect of a color pattern of a color filter for a display comprising a coloring agent, monomer having two or more ethylenic unsaturated bonds in a molecule, polymer and a solvent, wherein an amount of the solvent is from 25% by weight to 70% by weight of the whole ink and a viscosity of the ink is from 40 to 300 mPa·sec.; and
   after the applying step, radiating light thereon the small defect portion in the colored pattern to react the ethylenic unsaturated bond of the monomer, so that the correction ink is cured.

2. A process for producing a correction ink for a micro defect in a color pattern of a color filter for a display comprising a coloring agent, monomer having two or more ethylenic unsaturated bonds in a molecule, polymer and a solvent, wherein an amount of the solvent is from 25% by weight to 70% by weight of the whole ink, the process comprising the steps of:
   preparing a coloring agent dispersion by dispersing the coloring agent in the solvent;
   preparing a binder component by mixing the monomer having two or more ethylenic unsaturated bonds with the polymer;
   mixing the prepared coloring agent dispersion with the binder component; and
   adjusting so that an amount of the solvent is from 25% by weight to 70% by weight of the whole ink, an amount of the monomer is from 15% by weight to 65% by weight of the whole ink, an amount of the polymer is from 1% by weight to 25% by weight of the whole ink, a sum of the amount of the monomer and the polymer is from 30% by weight to 85% by weight of a total solid content contained in the ink, an amount of the coloring agent is from 5% by weight to 40% by weight of the whole ink, and a viscosity of the ink is from 40 to 300 mPa sec.

3. The process for producing a correction ink for a micro defect in a color pattern according to claim 2, wherein a polymerization inhibitor is added at the binder component-preparing step.

4. The process for producing a correction ink for a micro defect in a color pattern according to claim 2, wherein the polymer is heated and melted at the binder component-preparing step.

5. The process for producing a correction ink for a micro defect in a color pattern according to claim 2, wherein an amount of the solvent is from 25% by weight to 55% by weight of the whole ink.

6. The process for producing a correction ink for a micro defect in a color pattern according to claim 2, wherein the solvent is selected from the group consisting of alcohols solvent, cellosolves solvent, carbitols solvent, esters solvent, ketones solvent, cellosolve acetates solvent, carbitol acetates solvent, ethers solvent, aprotic amide solvent, lactones solvent, unsaturated hydrocarbons solvent, saturated hydrocarbons solvent, and a mixture thereof.

7. The method for correcting a micro defect in a color pattern according to claim 1, wherein an amount of the monomer is from 15% by weight to 65% by weight of the whole ink, an amount of the polymer is from 1% by weight to 25% by weight of the whole ink, a sum of the amount of the monomer and the polymer is from 30% by weight to 85% by weight of a total solid content contained in the ink, and an amount of the coloring agent is from 5% by weight to 40% by weight of the whole ink in the correction ink for a micro defect in a color pattern.

* * * * *